(12) United States Patent
Kilgard et al.

(10) Patent No.: US 7,286,133 B2
(45) Date of Patent: Oct. 23, 2007

(54) SYSTEM, METHOD AND COMPUTER PROGRAM PRODUCT FOR PROGRAMMABLE FRAGMENT PROCESSING

(75) Inventors: Mark J. Kilgard, Austin, TX (US); Patrick R. Brown, Raleigh, NC (US); Eric S. Werness, New Haven, CT (US)

(73) Assignee: NVIDIA Corporation, Santa Clara, CA (US)

( * ) Notice: Subject to any disclaimer, the term of this patent is extended or adjusted under 35 U.S.C. 154(b) by 50 days.

(21) Appl. No.: 11/126,719

(22) Filed: May 10, 2005

(65) Prior Publication Data

US 2005/0259103 A1 Nov. 24, 2005

Related U.S. Application Data

(60) Division of application No. 10/000,996, filed on Nov. 30, 2001, now Pat. No. 6,982,718, which is a continuation-in-part of application No. 09/877,348, filed on Jun. 8, 2001, now Pat. No. 6,697,064.

(51) Int. Cl.
*G06T 1/20* (2006.01)
(52) U.S. Cl. ....................................... 345/506
(58) Field of Classification Search ................. 345/506
See application file for complete search history.

(56) References Cited

U.S. PATENT DOCUMENTS

| 4,985,848 | A |   | 1/1991 | Pfeiffer et al. |
| 4,996,666 | A |   | 2/1991 | Duluk, Jr. |
| 5,020,115 | A |   | 5/1991 | Black |
| 5,123,085 | A |   | 6/1992 | Wells |
| 5,420,981 | A | * | 5/1995 | Ivie et al. ................... 709/227 |
| 5,535,288 | A |   | 7/1996 | Chen et al. |

(Continued)

FOREIGN PATENT DOCUMENTS

EP 0 690 430 A2 1/1996

(Continued)

OTHER PUBLICATIONS

Segal, Mark and Kurt Akeley. "The OpenGL Graphics System—A Specification". (Version 1.2.1)-Apr. 1, 1999. Silicon Graphics, Inc. pp. 1-12, 14, 42, 43, 57-61, 75, 80, 89-93, 100 126, 142 150, 157-158, 250.*

(Continued)

*Primary Examiner*—Kee M. Tung
*Assistant Examiner*—Aaron M. Richer
(74) *Attorney, Agent, or Firm*—Cooley Godward Kronish LLP

(57) ABSTRACT

A system, method and computer program product are provided for programmable processing of fragment data in a computer hardware graphics pipeline. Initially, fragment data is received in a hardware graphics pipeline. It is then determined whether the hardware graphics pipeline is operating in a programmable mode. If it is determined that the hardware graphics pipeline is operating in the programmable mode, programmable operations are performed on the fragment data in order to generate output. The programmable operations are performed in a manner/sequence specified in a graphics application program interface. If it is determined that the hardware graphics pipeline is not operating in the programmable mode, standard graphics application program interface (API) operations are performed on the fragment data in order to generate output.

9 Claims, 5 Drawing Sheets

U.S. PATENT DOCUMENTS

| | | | |
|---|---|---|---|
| 5,572,634 A | 11/1996 | Duluk, Jr. | |
| 5,574,835 A | 11/1996 | Duluk, Jr. et al. | |
| 5,596,686 A | 1/1997 | Duluk, Jr. et al. | |
| 5,669,010 A | 9/1997 | Duluk, Jr. | |
| 5,694,143 A | 12/1997 | Fielder et al. | |
| 5,764,228 A * | 6/1998 | Baldwin | 715/797 |
| 5,764,243 A * | 6/1998 | Baldwin | 345/506 |
| 5,798,762 A | 8/1998 | Sfarti et al. | |
| 5,798,770 A | 8/1998 | Baldwin | |
| 5,812,072 A | 9/1998 | Masters | |
| 5,821,940 A | 10/1998 | Morgan et al. | |
| 5,838,337 A | 11/1998 | Kimura et al. | |
| 5,966,532 A | 10/1999 | McDonald et al. | |
| 5,969,704 A | 10/1999 | Green et al. | |
| 5,977,987 A | 11/1999 | Duluk, Jr. | |
| 5,977,997 A | 11/1999 | Vainsencher | |
| 5,999,664 A | 12/1999 | Mahoney et al. | |
| 6,000,027 A | 12/1999 | Pawate et al. | |
| 6,046,747 A | 4/2000 | Saunders et al. | |
| 6,198,833 B1 | 3/2001 | Rangan et al. | |
| 6,219,064 B1 | 4/2001 | Kamen et al. | |
| 6,229,553 B1 | 5/2001 | Duluk, Jr. et al. | |
| 6,268,875 B1 | 7/2001 | Duluk, Jr. et al. | |
| 6,285,378 B1 | 9/2001 | Duluk, Jr. | |
| 6,288,730 B1 | 9/2001 | Duluk, Jr. et al. | |
| 6,392,655 B1 | 5/2002 | Migdal et al. | |
| 6,449,019 B1 | 9/2002 | Fincher et al. | |
| 6,469,704 B1 | 10/2002 | Johnson | |
| 6,476,808 B1 | 11/2002 | Kuo et al. | |
| 6,504,542 B1 | 1/2003 | Voorhies et al. | |
| 6,515,671 B1 | 2/2003 | Lindholm et al. | |
| 6,532,009 B1 | 3/2003 | Fox et al. | |
| 6,559,842 B1 | 5/2003 | Deering et al. | |
| 6,573,890 B1 | 6/2003 | Lengyel | |
| 6,614,444 B1 | 9/2003 | Duluk et al. | |
| 6,650,327 B1 | 11/2003 | Airey et al. | |
| 6,707,453 B1 | 3/2004 | Rossin et al. | |

FOREIGN PATENT DOCUMENTS

| | | | |
|---|---|---|---|
| JP | 10127002 A2 | 5/1998 | |
| WO | WO93/23816 A1 | 11/1993 | |
| WO | WO97/05575 A1 | 2/1997 | |
| WO | WO97/05576 A1 | 2/1997 | |
| WO | WO98/28695 A1 | 7/1998 | |
| WO | WO99/09473 A1 | 2/1999 | |
| WO | WO99/52040 A1 | 10/1999 | |
| WO | WO 00/10372 A2 | 3/2000 | |
| WO | WO 00/11562 A1 | 3/2000 | |
| WO | WO 00/11602 A2 | 3/2000 | |
| WO | WO 00/11603 A2 | 3/2000 | |
| WO | WO 00/11604 A2 | 3/2000 | |
| WO | WO 00/11605 A2 | 3/2000 | |
| WO | WO 00/11607 A1 | 3/2000 | |
| WO | WO 00/11613 A2 | 3/2000 | |
| WO | WO 00/11614 A2 | 3/2000 | |
| WO | WO 00/19377 A1 | 4/2000 | |

OTHER PUBLICATIONS

Provins, Dean. "Kill: The Command To End All Commands". Jan. 1, 1998. Linux Journal. (http://www.linuxjournal.com/article/1332).*

Unix Man Pages: Kill (2). Dec. 28, 1996. SunOS 5.9 (http://bama.ua.ed/cgi-bin/man-cgi?kill+2).*

U.S. Appl. No. 09/877,851.

U.S. Appl. No. 09/877,852.

http://www.opengl.org/developers/documentation/extensions.html http://oss.sgi.com/projects/ogl-sample/registry/doc/rules.html—downloaded May 28, 2002—.

Eyles et al., "PixelFlow: The Realization, Hewlett-Packard Company," *Chapel Hill Graphics Lab*, North Carolina.

Olano et al., "A Shading Languages on Graphics Hardware: The PixelFlow Shading System," Jul. 1998, Orlando, Florida.

Olano et al., "Triangle Scan Conversion Using 2D Homogeneous Coordinates," 1997 SIGGRAPH/Eurographics Workshop; pp. 89-95.

Reisis, "Improved Graph Computations on the Reconfigurable Mesh," IEEE 1991.

Segal et al., The OpenGL® Graphics System: A Specification (Version 1.2.1), Apr. 1991.

Yedavalli, "A necessary and sufficient virtual edge solution for checking robust atability of interval matrices," Proceeding of the American Control Conference, Jun. 1998.

* cited by examiner

| Get Value | Type | Get Command | Initial Value | Description | Section | Attribute |
|---|---|---|---|---|---|---|
| FRAGMENT_PROGRAM_NV | B | IsEnabled | FALSE | fragment program mode enable | 3.11 | enable |
| FRAGMENT_PROGRAM_BINDING_NV | Z+ | GetIntegerv | 0 | bound fragment program | 5.7 | - |

| Get Value | Type | Get Command | Initial Value | Description | Section | Attribute |
|---|---|---|---|---|---|---|
| PROGRAM_ERROR_POSITION_NV | Z | GetIntegerv | -1 | program error position | 5.7 | - |
| PROGRAM_TARGET_NV | Z2 | GetProgramivNV | 0 | program target | 6.1.13 | - |
| PROGRAM_LENGTH_NV | Z+ | GetProgramivNV | 0 | program length | 6.1.13 | - |
| PROGRAM_RESIDENT_NV | Z2 | GetProgramivNV | False | program residency | 6.1.13 | - |
| PROGRAM_STRING_NV | ubxn | GetProgramStringNV | "" | program string | 6.1.13 | - |
| - | R4 | GetProgramLocal-ParameterNV | (0,0,0,0) | program local parameter value | 6.1.13 | - |

| Get Value | Type | Get Command | Initial Value | Description | Section | Attribute |
|---|---|---|---|---|---|---|
| - | 12xR4 | - | fragment data | fragment attribute registers | 3.11.1.1 | - |
| - | 16xR4 | - | (0,0,0,0) | fp32 temporary registers | 3.11.1.2 | - |
| - | 32xR4 | - | (0,0,0,0) | fp16 temporary registers | 3.11.1.2 | - |
| - | (Z_3)4 | - | (EQ,EQ,EQ,EQ) | condition code register address register | 3.11.1.4 | - |

| Get Value | Type | Get Command | Minimum Value | Description | Section | Attribute |
|---|---|---|---|---|---|---|
| MAX_TEXTURE_COORDS_NV | Z+ | GetIntegerv | 2 | number of texture coordinate sets supported | 2.6 | - |
| MAX_TEXTURE_IMAGE_UNITS_NV | Z+ | GetIntegerv | 2 | number of texture image units supported | 2.10.2 | - |

Figure 5

SYSTEM, METHOD AND COMPUTER PROGRAM PRODUCT FOR PROGRAMMABLE FRAGMENT PROCESSING

RELATED APPLICATION(S)

This application is a divisional application of U.S. patent application Ser. No. 10/000,996 entitled, "System, Method and Computer Program Product for Programmable Fragment Processing in a Graphics Pipeline," filed on Nov. 30, 2001 now U.S. Pat. No. 6,982,718, which is a continuation-in-part of U.S. patent application Ser. No. 09/877,348, Patent No. 6,697,064, entitled "System, Method and Computer Program Product for Matrix Tracking During Vertex Processing in a Graphics Pipeline" filed on Jun. 8, 2001, the contents of which are hereby incorporated by reference in their entirety.

FIELD OF THE INVENTION

The present invention relates to computer graphics, and more particularly to fragment processing in a hardware graphics pipeline.

BACKGROUND OF THE INVENTION

Conventional fragment processing for three-dimensional (3-D) graphics programming application program interfaces (APIs) such as Open Graphics Library (OpenGL®) and Direct3D™ provide support for per-fragment processing (i.e. texture mapping, color sum, fog, etc.). The computations provided by such conventional fragment processing are routinely implemented by 3-D graphics hardware that greatly accelerates these operations.

Unextended OpenGL mandates a certain set of configurable per-fragment computations defining texture lookup, texture environment, color sum, and fog operations. Each of these areas provide a useful but limited set of fixed operations. For example, unextended OpenGL 1.2.1 provides only four texture environment modes, color sum, and three fog modes.

To enable more advanced rendering effects, certain extensions have either improved the functionality or introduced new models of configurability for fragment operations. Texture environment operations have been enhanced by extensions such as NV_register_combiners, ARB_texture_env_add, EXT_texture_env_combine, and EXT_texture_env_dot3. NV_texture_shader allows a number of special operations, including dependent texture lookups (where the results of one texture lookup are used to modify or replace texture coordinates used for a second lookup). Similar special-purpose extensions (i.e. NV_fog_distance, EXT_fog_coord) have introduced some level of configurability to fog.

Each such extension adds a limited set of special-case modes, and enables a new set of rendering effects. The set of effects enabled, however, is limited by the set of special modes introduced by the extension. This lack of flexibility is in sharp contrast to the high-level of programmability of general-purpose CPUs and other (frequently software-based) shading languages.

There is thus a need for an extension capable of exposing an application writer to an unprecedented degree of programmability in the computation of final fragment colors and depth values.

DISCLOSURE OF THE INVENTION

A system, method and computer program product are provided for programmable processing of fragment data in a computer hardware graphics pipeline. Initially, fragment data is received in a hardware graphics pipeline. It is then determined whether the hardware graphics pipeline is operating in a programmable mode. If it is determined that the hardware graphics pipeline is operating in the programmable mode, programmable operations are performed on the fragment data in order to generate output. The programmable operations are performed in a manner/sequence specified in a graphics application program interface. If it is determined that the hardware graphics pipeline is not operating in the programmable mode, standard graphics application program interface (API) operations are performed on the fragment data in order to generate output.

Thus, programmable operations may be selectively performed on the fragment data in the computer hardware graphics pipeline in a manner and/or sequence specified in a graphics application program interface.

The programmable operations may be optionally performed in a sequence specified in a graphics application program interface in textual form. Further, the programmable operations may further include non-deferred, per-fragment programmable operations which occur at time of rasterization, before the fragment data is stored in a frame buffer. Still yet, the fragment data may include vectors such as floating-point vectors and/or multiple component vectors.

In one embodiment, the fragment data may be received from a rasterizer. Further, the fragment data may include constant registers associated with a fragment, attributes associated with a fragment, color values, etc. As an option, the attributes may include at least one texture coordinate set.

In another embodiment, the programmable operations may include retrieving texture data. Such texture data may be retrieved utilizing arbitrarily computed texture coordinates.

In another embodiment, the programmable operations may include mathematical computations.

In still another embodiment, the operations may be simultaneously performed on fragment data representing a plurality of different fragments. Further, the programmable operations may include programmable blending operations. Still yet, the programmable operations may include subroutines, and/or be capable of branching.

In still yet another embodiment, the output of the programmable operations may include color values associated with a fragment. Such output of the programmable operations may further include depth values associated with a fragment.

In still a further embodiment, the standard graphics application program interface may include OpenGL®. Further, the standard graphics application program interface operations may be selected from the group consisting of texturing operations, color sum operations, and fog operations.

As an option, the programmable operations may include a kill operation, a partial derivative operation, a texture mapping operation, a pack/unpack operation, among others. Further, the fragment data may be operated upon in a form which includes multiple-component vectors in a floating point or fixed-point representation.

The present technique may, in one embodiment, take the form of an extension that provides a mechanism for defining fragment program instruction sequences for application-defined fragment programs. When in fragment program mode, a fragment program may be executed each time a fragment is produced by rasterization. The inputs for the program may be a set of constant registers and the attributes (colors, texture coordinates) associated with the fragment. Further, a fragment program may perform texture lookups using arbitrary texture coordinates and mathematical computations. The results of a fragment program are new color and depth values for the fragment.

In one embodiment, a fragment program may be received, and computer code may be provided for translating the fragment program. The fragment program may thus be translated for being handled by hardware that is partially programmable. Thus, a computer program product is provided that translate a user-specified fragment program and possibly its inputs into a form suitable for execution on hardware that is not fully programmable.

These and other advantages of the present invention may become apparent upon reading the following detailed description and studying the various figures of the drawings.

BRIEF DESCRIPTION OF THE DRAWINGS

The foregoing and other aspects and advantages are better understood from the following detailed description of a preferred embodiment of the invention with reference to the drawings, in which:

FIG. 5 illustrates new states that may be relevant in the context of one embodiment.

DESCRIPTION OF THE PREFERRED EMBODIMENTS

Figure 1:
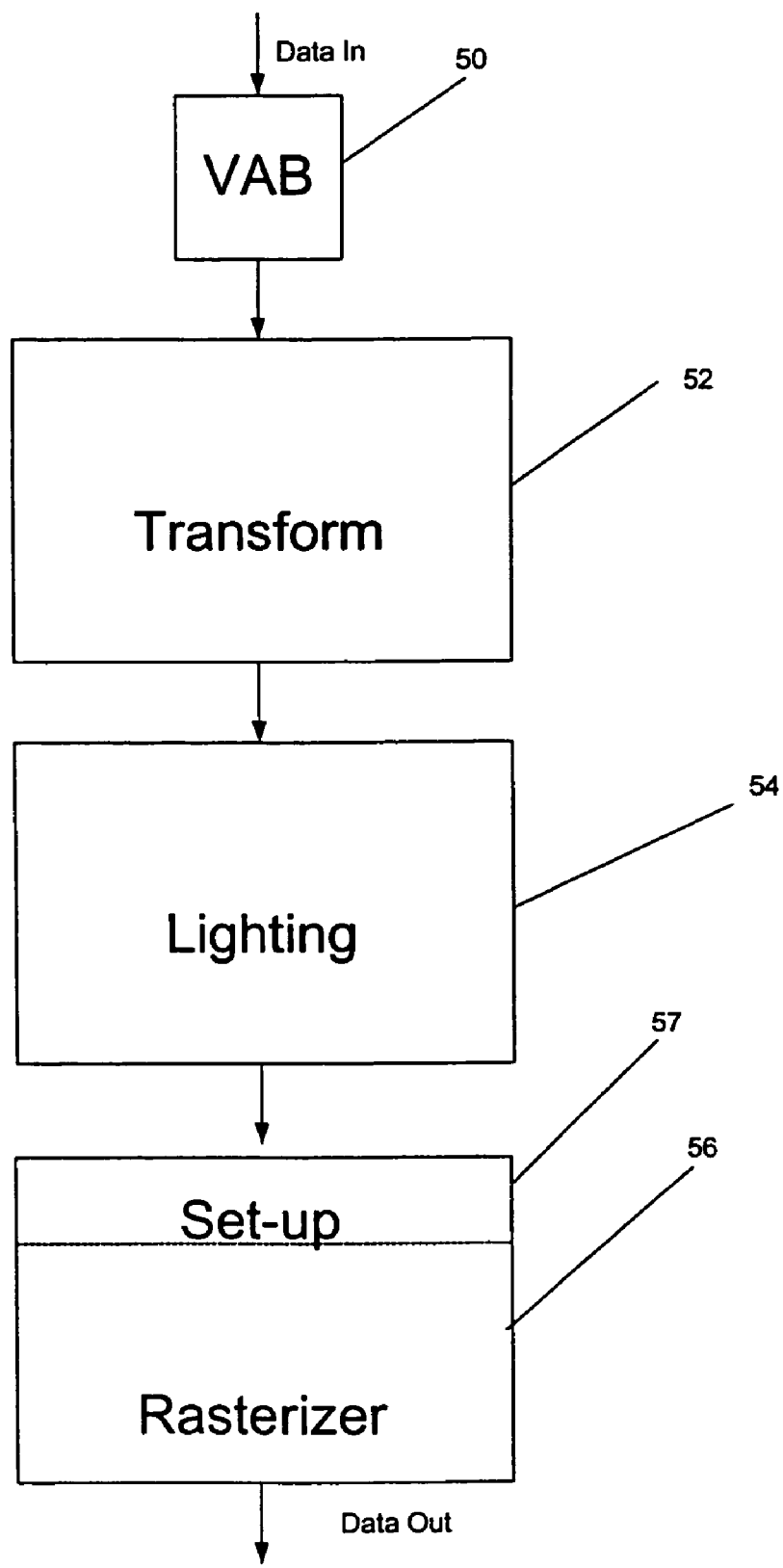
FIG. 1 is a diagram illustrating the various components of one embodiment of the present invention.

FIG. 1 is a diagram illustrating the various components of one embodiment of the present invention. As shown, the present embodiment includes a plurality of modules having a vertex attribute buffer (VAB) 50, a transform module 52, a lighting module 54, and a rasterization module 56 with a set-up module 57.

As an option, each of the foregoing modules may be situated in hardware. In the present description, hardware may refer to a sole unitary semiconductor-based integrated circuit or chip. It should be noted that the term hardware may also refer to multi-chip modules with increased connectivity which simulate on-chip operation, and make substantial improvements over utilizing a conventional CPU and bus implementation. Of course, the present invention may also be implemented on multiple semiconductor platforms. As an option, at least portions of the present invention may also be implemented utilizing a conventional CPU and software implementation.

During operation, the VAB 50 is included for gathering and maintaining a plurality of vertex attribute states such as position, normal, colors, texture coordinates, etc. Completed vertices are processed by the transform module 52 and then sent to the lighting module 54. The transform module 52 generates vectors for the lighting module 54 to light. The output of the lighting module 54 is screen space data suitable for the set-up module which, in turn, sets up primitives. Thereafter, rasterization module 56 carries out rasterization of the primitives.

An interface may be used in conjunction with the various components set forth in FIG. 1. In one embodiment, such interface may include at least in part the Open Graphics Library (OpenGL®), Direct3D™ application program interfaces (APIs), a proprietary application program interface, etc. OpenGL® is the computer industry's standard application program interface (API) for defining 2-D and 3-D graphic images. With OpenGL™, an application can create the same effects in any operating system using any OpenGL®-adhering graphics adapter. OpenGL® specifies a set of commands or immediately executed functions. Each command directs a drawing action or causes special effects. OpenGL® and Direct3D™ APIs are commonly known to those of ordinary skill, and more information on the same may be found by reference to the OpenGL® Specification Version 1.2.1, which is incorporated herein by reference in its entirety.

Such application program interfaces add a small set of relatively inflexible per-fragment computations. This inflexibility is in contrast to the typical flexibility provided by the underlying programmable floating point engines (whether micro-coded vertex engines, digital signal processors (DSPs), or central processor units (CPUs)).

Figure 2:
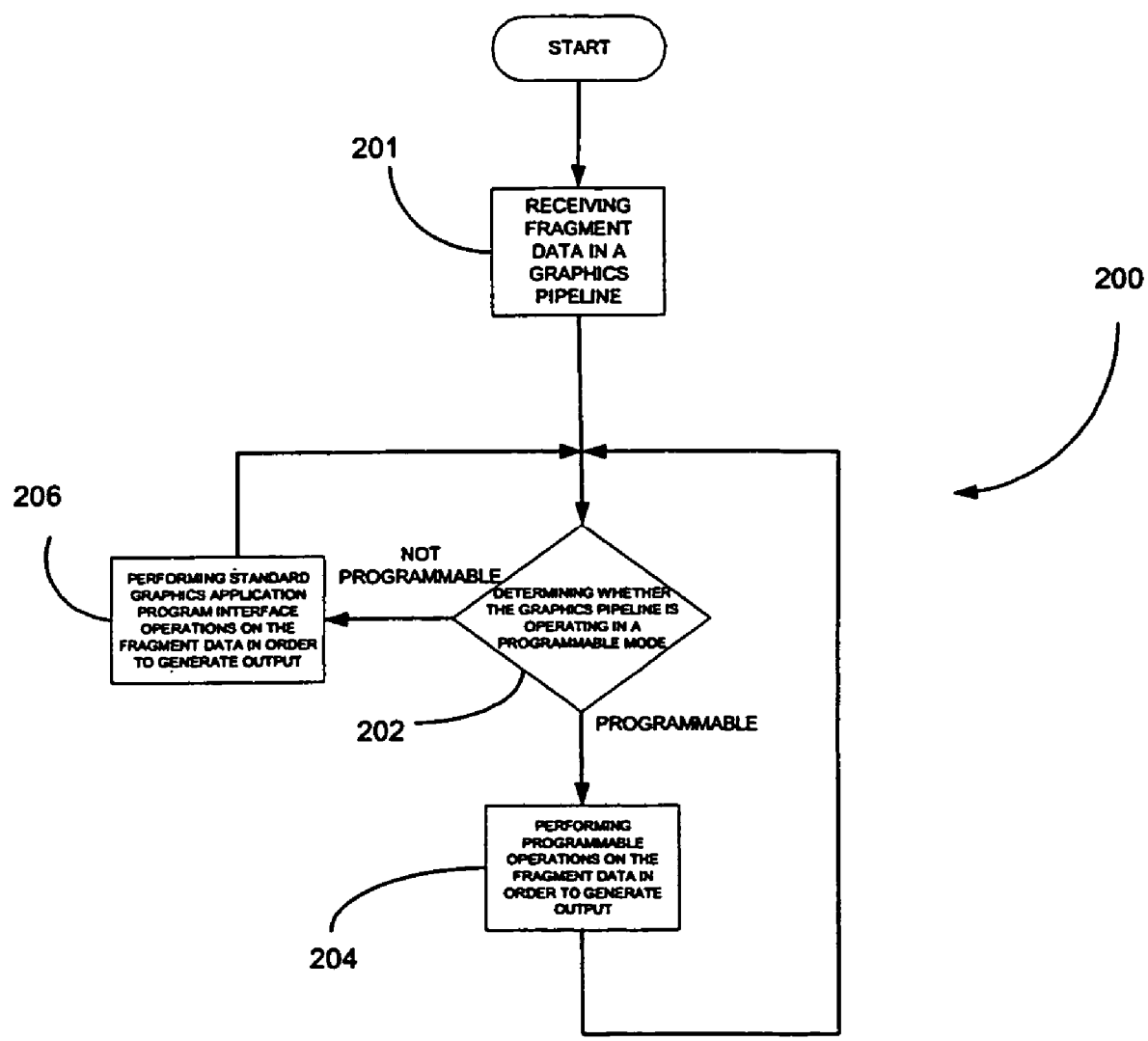
FIG. 2 illustrates a method for programmable fragment processing, in accordance with one embodiment.

FIG. 2 illustrates a method 200 for programmable fragment processing, in accordance with one embodiment. Such programmable fragment processing may be carried out in the form of an extension or integral component of any desired application program interface. Of course, the present technique may be implemented in any desired manner in an architecture such as that shown in FIG. 1 or in any other desired context.

Initially, in operation 201, fragment data is received in a graphics pipeline. As an option, the fragment data may be received from a rasterizer such as that shown in FIG. 1. It should be noted, however, that the receipt of the fragment data may occur at any point in the graphics pipeline.

As an option, the fragment data may include constant registers associated with a fragment, attributes associated with a fragment, color values, etc. Further, the attributes may include texture coordinates. It should be noted that the fragment data may include any type of data associated with fragments. In the context of the present description, a fragment includes entities generated by rasterization of primitives, where a fragment corresponds to at least one pixel.

Next, in decision 202, it is determined whether the graphics pipeline is operating in a programmable mode. This may be accomplished via any type of signal or command. Just by way of example, a command associated with an application program interface may indicate whether the graphics pipeline is operating in the programmable mode. Such command may optionally be called by a program which governs operation of the graphics pipeline via the application program interface.

If it is determined that the graphics pipeline is operating in the programmable mode, programmable operations are performed on the fragment data in order to generate output. See operation 204. In the context of the present description, the term programmable may refer to any technique capable of allowing the processing of the fragment data to be programmed.

In one embodiment, the programmable operations may include retrieving texture data. In particular, such texture data may be retrieved utilizing arbitrarily computed texture coordinates. In such embodiment, the fragment program execution environment may access textures via arbitrarily computed texture coordinates. As such, there is no necessary correspondence between the texture coordinates and texture maps previously lumped into a single "texture unit". This technique enables implementations where the number of texture coordinate sets and texture image units may differ, providing methods for querying the number of each supported by the implementation.

It should be noted that the texture coordinates do not need to be used to index into texture maps (i.e. they can be used for arbitrary computations). For example, a 3-D texture coordinate may hold a surface normal that could be used for per-fragment lighting computations.

In another embodiment, the programmable operations may include mathematical computations. Further, the programmable operations may include a kill operation, a partial derivative operation, a texture mapping operation, a pack/unpack operation, among others. More information on such programmable operations will be set forth hereinafter in greater detail.

In still another embodiment, the operations may simultaneously performed on fragment data representing a plurality of different fragments. Further, the programmable operations may include programmable blending operations. Such blending may include a process of combining fragment color with the color already in the frame buffer. Still yet, the programmable operations may include subroutines, and/or be capable of branching. The branching may be based on condition evaluation, or any other desired technique.

It should be noted that the output of the programmable operations may include any desired values that may be used for graphics processing. For example, the output of the programmable operations may include color values associated with a fragment. Such output of the programmable operations may further include depth values associated with a fragment. The desired values could include surface normals, computed displacements, distances. In the scope of this invention, these values may or may not be passed down as texture coordinates. Still yet, the programmable operations may include non-deferred, per-fragment programmable operations which occur at time of rasterization, before the fragment data is stored in a frame buffer.

As another option, the fragment data may be operated upon in a form which includes multiple-component (i.e. 1, 2, 3, 4, etc.) vectors in a floating point or fixed-point representation for reasons that will soon become apparent. In particular, the present technique may define a programming model including a 4-component vector instruction set, 16- and 32-bit floating-point data types, and a relatively large set of temporary registers.

In still yet another embodiment, the programmable operations may be performed utilizing register combiners and possibly in the context of multi-texturing (i.e. ARB_multitexture extension) with a plurality of texture units. More information on register combiners may be found with reference to a co-pending application entitled "IMPROVED GRAPHICS PIPELINE INCLUDING COMBINER STAGES" filed Mar. 20, 1999 naming David B. Kirk, Matthew Papakipos, Shaun Ho, Walter Donovan, and Curtis Priem as inventors, and which is incorporated herein by reference in its entirety.

Figure 3:
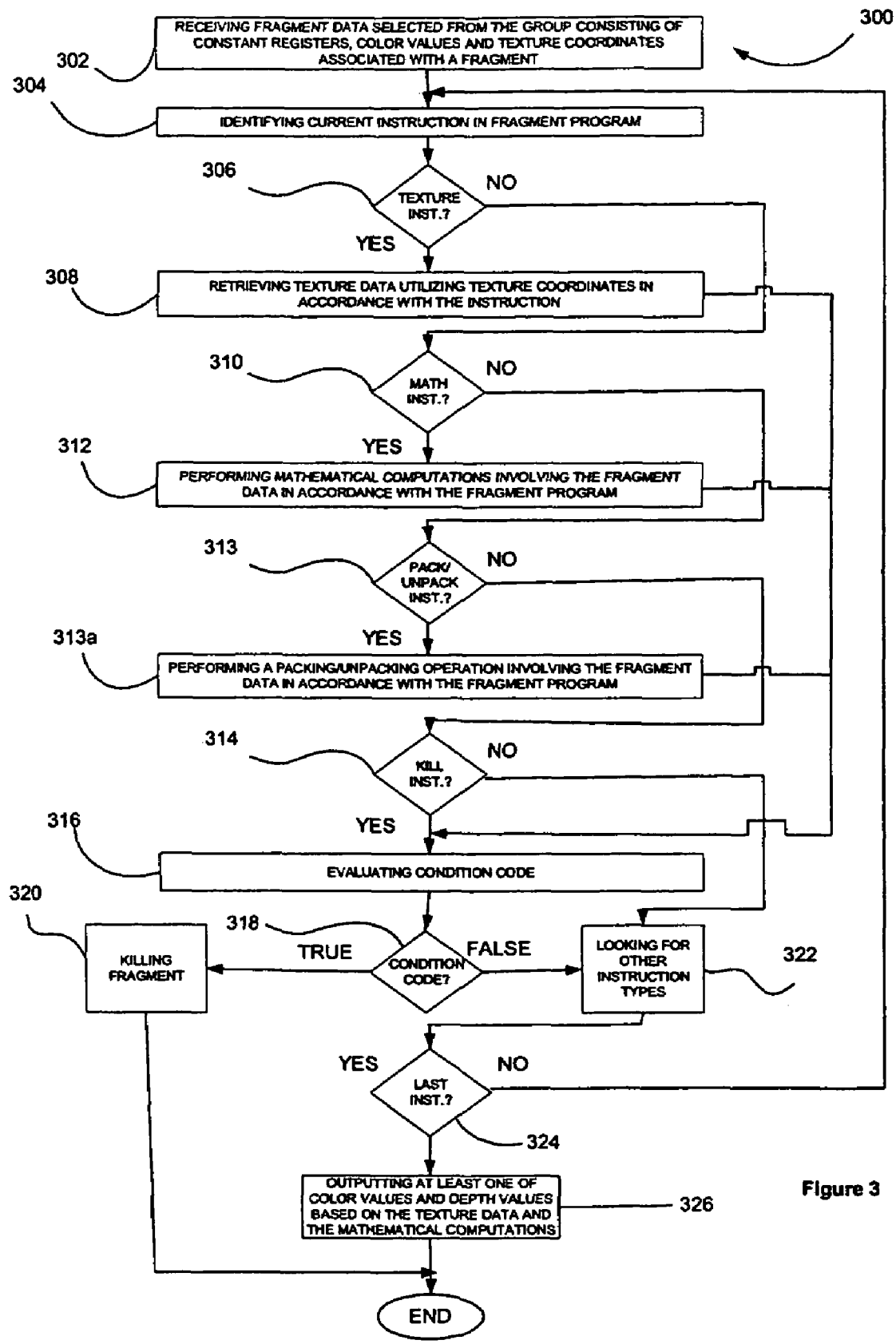
FIG. 3 illustrates a method for programmable processing of fragment data in a computer hardware graphics pipeline, in accordance with operation 204 of FIG. 2.

An exemplary method in which operation 204 is executed will be set forth in greater detail during reference to FIG. 3.

If, on the other hand, it is determined in decision 202 that the graphics pipeline is not operating in the programmable mode, standard graphics application program interface (API) operations are performed on the fragment data in order to generate output. Note operation 206.

As an option, the standard graphics application program interface may include OpenGL® or any other desired graphics application program interface. Further, the standard graphics application program interface operations may be selected from the group consisting of texturing operations, color sum operations, fog operations, among others.

In one embodiment, a fragment program may be received, and computer code may be provided for translating the fragment program. The fragment program may thus be translated for being handled by hardware that is partially programmable. Thus, a computer program product is provided that translate a user-specified fragment program and possibly its inputs into a form suitable for execution on hardware that is not fully programmable.

FIG. 3 illustrates a method 300 for programmable processing of fragment data in a computer graphics pipeline, in accordance with operation 204 of FIG. 2. It should be noted, however, that the present method 300 may be carried out independent of the method 200 of FIG. 2.

As shown, fragment data is received which is selected from the group consisting of constant registers, color values and texture coordinates associated with a fragment. Note operation 302. Next, a current instruction of a fragment program is identified in operation 304. This may be accomplished utilizing a pointer or the like.

Subsequently, it is determined in decision 306 as to whether the identified instruction is a texture instruction. If so, texture data is retrieved utilizing texture coordinates in accordance with the fragment program. See operation 308. Thereafter, a condition code is evaluated, as will be set forth in greater detail during reference to operation 316.

In a similar manner, it is determined in decision 310 as to whether the identified instruction is a mathematical instruction. If so, mathematical computations are performed involving the fragment data in accordance with the fragment program, as indicated in operation 312. Thereafter, a condition code is evaluated, as will be set forth in greater detail during reference to operation 316.

Similarly, it is determined in decision 313 as to whether the identified instruction is a packing or unpacking instruction. If so, a packing or unpacking operation is performed involving the fragment data in accordance with the fragment program, as indicated in operation 313a. Thereafter, a condition code is evaluated, as will be set forth in greater detail during reference to operation 316.

Next, it is determined in decision 314 as to whether the identified instruction is a kill instruction. If so, a condition code is evaluated in operation 316. More information regarding such condition code will be set forth hereinafter in greater detail. If the condition code is evaluated to be TRUE, the fragment is killed and the program is terminated. Note operation 320. If, however, the condition code is evaluated to be FALSE, other "special" instruction types are searched and executed. Note operation 322.

It is then determined in decision 324 as to whether the current instruction is the last instruction of the fragment program. If not, the various operations are repeated using the next instruction. If so, however, at least one of color values and depth values are outputted based on the texture data, the mathematical computations, etc. Note operation 326.

The present technique may, in one embodiment, may take the form of an application program interface (i.e. extension, or any type of interface, etc.) that provides a mechanism for defining fragment program instruction sequences for application-defined fragment programs. As an option, such graphics application program interface may take a textual form. In the context of the present description, the term textual may refer to any form such as a sequence of instructions, program calls, program strings, or any other alphanumeric form that is capable of specifying a sequence of programmable operations.

When in fragment program mode, a fragment program may be executed each time a fragment is produced by rasterization. The inputs for the program may be a set of constant registers and the attributes (colors, texture coordinates) associated with the fragment. Further, a fragment program may perform texture lookups using arbitrary texture coordinates and mathematical computations. The results of a fragment program are new color and depth values for the fragment.

The present fragment program execution environment may be designed for efficient hardware implementation and to support a wide variety of programs. By design, the operations defined by existing OpenGL per-fragment computation extensions can be implemented using the present model.

More information will now be set forth regarding an exemplary embodiment of the foregoing technique. The following description is set forth in the context of OpenGL® which is commonly known to those of ordinary skill. More particularly, the following information is set forth in the context of the OpenGL® Specification Version 1.2.1, which is incorporated herein by reference in its entirety. It should be noted that, in the present description, OpenGL® API commands and tokens are prefixed by "gl" and "GL_," respectively. Also, OpenGL® extension commands and tokens proprietary to NVIDIA® Corporation are, by convention, suffixed by "NV" or "_NV," respectively. When the context is clear, such prefixes and suffices are dropped for brevity and clarity.

Table #1 illustrates exemplary procedures and functions that may be included in the present embodiment.

TABLE #1 void ProgramLocalParameter4fNv(uint id, sizei len, const ubyte *name, float x, float y, float z, float w);
void ProgramLocalParameter4dNv(uint id, sizei len, const ubyte *name, double x, double y, double z, double w);
void ProgramLocalParameter4fvNV(uint id, sizei len, const ubyte *name, const float v[ ]);
void ProgramLocalParameter4dvNv(uint id, sizei len, const ubyte *name, const double v[ ]);
void GetProgramLocalParameterfvNV(uint id, sizei len, const ubyte *name, float *params);
void GetProgramLocalParameterdvNv(uint id, sizei len, const ubyte *name, double *params);

Table #2 illustrates various tokens that may be provided.

TABLE #2

Accepted by the <cap> parameter of Disable, Enable, and IsEnabled, by the <pname> parameter of GetBooleanv, GetIntegerv, GetFloatv, and GetDoublev, and by the <target> parameter of BindProgramNV and LoadProgramNV:
    FRAGMENT_PROGRAM_NV    0x8870
Accepted by the <pname> parameter of GetBooleanv, GetIntegerv, GetFloatv, and GetDoublev:
    MAX_TEXTURE_COORDS_NV    0x8871
    MAX_TEXTURE_IMAGE_UNITS_NV    0x8872

Figure 4:
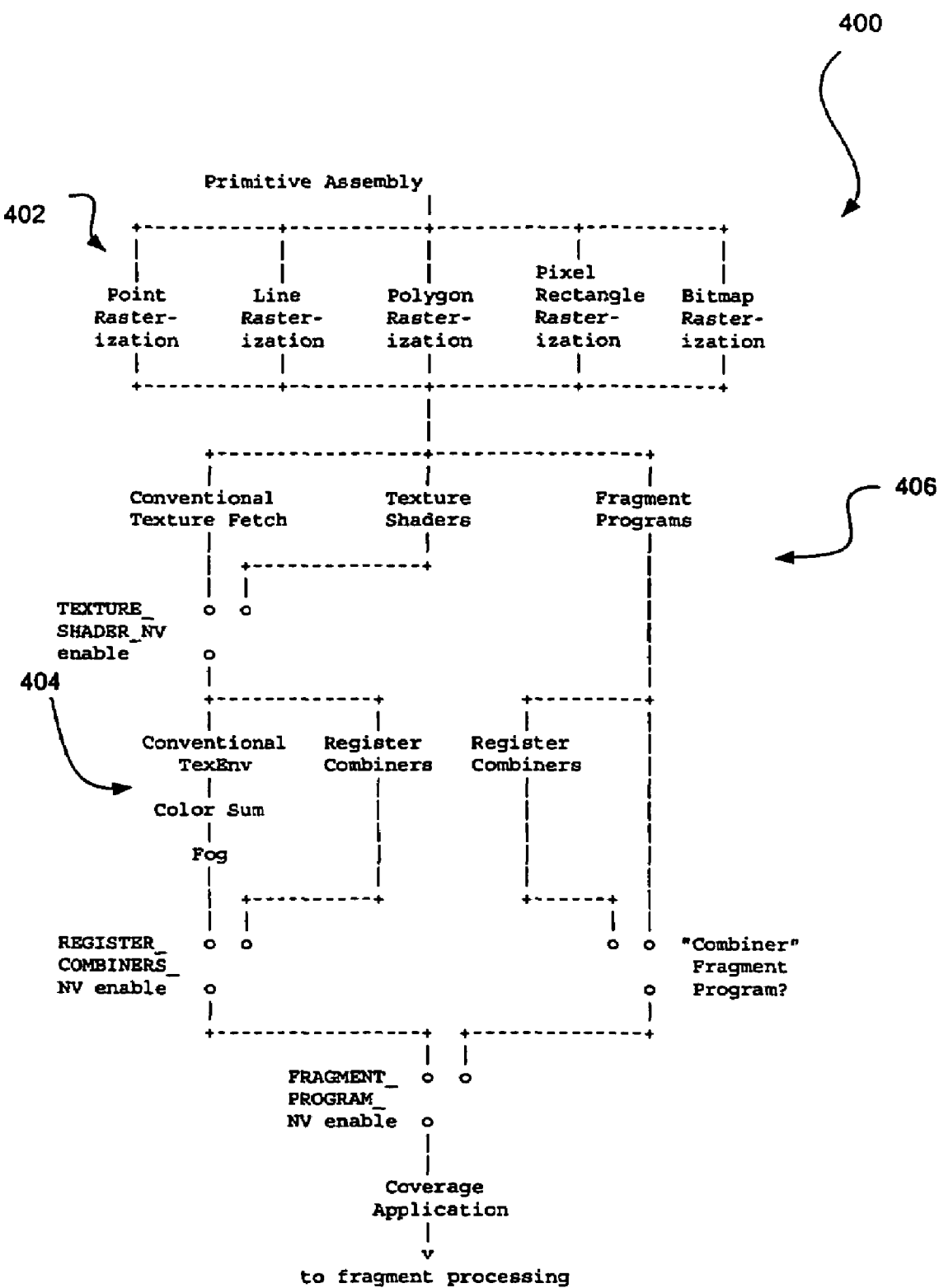
FIG. 4 diagrams a rasterization process in accordance with one embodiment.

FIG. 4 diagrams the rasterization process 400, in accordance with one embodiment. The color value assigned to a fragment is initially determined by the rasterization operations 402 in a manner that is well known, and modified by either the execution of well known texturing, color sum, and fog operations 404; or of a fragment program 406. As such, the final color and depth values are initially determined by the rasterization operations and may be modified by a fragment program. More information on this topic that is well known to those of ordinary skill may be found in Chapter 3 of the OpenGL® 1.2.1 Specification.

Basic Line Segment Rasterization

With respect to basic line segment rasterization, the value of an associated datum f from the fragment, whether it be R, G, B, or A (in RGBA mode) or a color index (in color index mode), the s, t, r, or q texture coordinate, or the clip w coordinate (the depth value, window z), may be found using Equation #1.

$$f = \frac{(1-t) * f\_a/w\_a + t * f\_b/w\_b}{(1-t)/w\_a + t/w\_b}$$ Equation #1 f_a and f_b are the data associated with the starting and ending endpoints of the segment, respectively. w_a and w_b are the clip w coordinates of the starting and ending endpoints of the segments, respectively. Note that linear interpolation may use Equation #2.

$$f = (1-t)*f\_a + t*f\_b$$ Equation #2

It should be noted that a GL implementation may choose to approximate Equations #1 and #2, but this may lead to unacceptable distortion effects when interpolating texture coordinates or clip w coordinates.

Basic Polygon Rasterization

With respect to basic polygon rasterization, one may wish to denote a datum at p_a, p_b, or p_c as f_a, f_b, or f_c, respectively. Then the value of a datum at a fragment produced by rasterizing a triangle is given by Equation #3.

$$f = \frac{a*f\_a/w\_a + b*f\_b/w\_b + c*f\_c/w\_c}{a/w\_a + b/w\_b + c/w\_c}$$ Equation #3 w_a, w_b, and w_c are the clip w coordinates of p_a, p_b, and p_c, respectively. a, b, and c are the barycentric coordinates of the fragment for which the data are produced. a, b, and c may correspond precisely to the exact coordinates of the center of the fragment. Another way of saying this is that the data associated with a fragment may be sampled at the fragment's center.

Just as with line segment rasterization, Equation #3 may be approximated by Equation #4.

$$f = a*f\_a + b*f\_b + c*f\_c$$ Equation #4

This may yield acceptable results for color values (it may be used for depth values), but may lead to unacceptable distortion if used for texture coordinates. More information on this topic that is well known to those of ordinary skill may be found in Section 3.4.1 of the OpenGL® 1.2.1 Specification.

Texturing

With respect to texturing, except when in fragment program mode, the (s,t,r) texture coordinates used for texturing are the values s/q, t/q, and r/q, respectively, where s, t, r, and q are the texture coordinates associated with the fragment. When in fragment program mode, the (s,t,r) texture coordinates are specified by the program. If q is less than or equal to zero, the results of texturing are undefined. More information on this topic that is well known to those of ordinary skill may be found in Section 3.8 of the OpenGL® 1.2.1 Specification.

Fragment Programs

Fragment program mode is enabled and disabled with the Enable and Disable commands using a symbolic constant such as FRAGMENT_PROGRAM_NV. When fragment program mode is enabled, standard and extended texturing, color sum, and fog application stages may at least partially be ignored and a general purpose program may be executed instead. A fragment program may be defined as a sequence of instructions that execute on a per-fragment basis.

In fragment program mode, the currently bound fragment program may be executed as each fragment is generated by the rasterization operations. Fragment programs may execute a finite fixed sequence of instructions with no branching or looping, and operate independently from the processing of other fragments. It should be noted that, in other embodiments, branching, looping, and/or subroutine call constructions may be included as well as dependencies between fragments.

There are various types of fragment programs. For example, a color fragment program is used to compute new color values to be associated with each fragment. A combiner fragment program is used to compute texture colors used by a combiner extension such as NV_register_combiners. Either type of fragment program or any other type can be used to compute a new depth value to be associated with each fragment.

Fragment program mode may not necessarily be available in color index mode and may thus be considered disabled, regardless of the state of the fragment program enable. When fragment program mode is enabled, texture shaders (i.e. NV_texture_shader extension) may be disabled, regardless of the state of the texture shaders extension.

Fragment Program Registers

Fragment programs may operate on a set of program registers. Each program register is a 4-component vector, whose components are referred to as "x", "y", "z", and "w" respectively. The components of a fragment register are referred to in this manner, regardless of the meaning of their contents.

The four components of each fragment program register have one of two different representations: 32-bit floating-point (fp32) or 16-bit floating-point (fp16). Of course, various other fixed- or floating-point representations may also be used. More details on these representations will be set forth hereinafter.

There are several different classes of program registers. Attribute registers are shown in Table #3 and correspond to the fragment's associated data produced by rasterization. Temporary registers (see Table #4) hold intermediate results generated by the fragment program. Output registers (Table #6) show logical registers used to hold the outputs of a fragment program. Output registers need not necessarily be actual physical registers; they may share space with temporary registers. The single condition code register may be used to mask writes to other registers or to determine if a fragment should be discarded. Of course, there may be multiple condition code registers in various embodiments.

Fragment Program Attribute Registers

TABLE #3

| Fragment Attribute Register Name | Description | Component Interpretation |
|---|---|---|
| f[WPOS] | Position of the fragment center. | (x, y, z, 1/w) |
| f[COL0] | Interpolated primary color | (r, g, b, a) |
| f[COL1] | Interpolated secondary color | (r, g, b, a) |
| f[FOGC] | Interpolated fog distance/coord | (z, 0, 0, 1) |
| f[TEX0] | Texture coordinate (unit 0) | (s, t, r, q) |
| f[TEX1] | Texture coordinate (unit 1) | (s, t, r, q) |
| f[TEX2] | Texture coordinate (unit 2) | (s, t, r, q) |
| f[TEX3] | Texture coordinate (unit 3) | (s, t, r, q) |
| f[TEX4] | Texture coordinate (unit 4) | (s, t, r, q) |
| f[TEX5] | Texture coordinate (unit 5) | (s, t, r, q) |
| f[TEX6] | Texture coordinate (unit 6) | (s, t, r, q) |
| f[TEX7] | Texture coordinate (unit 7) | (s, t, r, q) |

Component interpretation describes the mapping of attribute values with register components. For example, the "x" component of f[COL0] holds the red color component, and the "x" component of f[TEX0] holds the "s" texture coordinate for texture unit 0. The entries "0" and "1" indicate that the attribute register components hold the constants 0 and 1, respectively.

The fragment attribute registers (Table #3) hold the location of the fragment and the data associated with the fragment produced by rasterization. f[WPOS].x and f[WPOS].y hold the (x,y) window coordinates of the fragment center, relative to the lower left corner of the window. f[WPOS].z holds the associated z window coordinate, normally in the range [0,1]. f[WPOS].w holds the reciprocal of the associated clip w coordinate. f[COL0] and F[COL1] hold the associated RGBA primary and secondary colors of the fragment, respectively. f[FOGC] holds the associated eye distance or fog coordinate used for fog. f[TEX0] through f[TEX7] hold the associated texture coordinates for texture coordinate sets 0 through 7, respectively.

In one embodiment, all attribute register components may be treated as 32-bit floats. However, since rasterization typically generates colors with a precision matching that of the frame buffer, the values of f[COL0] and f[COL1] may not necessarily have been generated with full floating-point precision.

In one embodiment, the fragment attribute registers may not be modified by a fragment program. In addition, each fragment program instruction can use at most one attribute register.

Fragment Program Temporary Registers

TABLE #4

| Fragment Temporary Register Name | Description |
|---|---|
| R0-R15 | Four 32-bit (fp32) floating point values (s.e8.m23). |
| H0-H31 | Four 16-bit (fp16) floating point values (s.e5.m10). |

The fragment temporary registers (Table #4) hold intermediate values used during the execution of a fragment program. There are forty-eight temporary register names, but in some embodiments, not all can necessarily be used simultaneously.

In one embodiment, the register names may correspond to sixteen physical registers, each of which can hold one complete fp32 vector, two independent fp16 vectors, or a mixture of fp32 and fp16 components. The temporary registers R0, H0, and H1 all refer to the first physical register; R15, H30, and H31 all refer to the last physical register. Of course, the assignment of data to the physical register set may vary per the desires of the user.

Each 128-bit physical register has eight 16-bit slots. Each slot can hold half of an fp32 value or an entire fp16 value, and has one of the associated data types enumerated in Table #5.

TABLE #5

| Slot Type | Slot1 | Slot2 | Slot3 | Slot4 | Slot5 | Slot6 | Slot7 | Slot8 |
|---|---|---|---|---|---|---|---|---|
| unwritten | all 0 | all 0 | all 0 | all 0 | all 0 | all 0 | all 0 | all 0 |
| unknown | NONE | NONE | NONE | NONE | NONE | NONE | NONE | NONE |
| fp32 | R0.x | R0.x | R0.y | R0.y | R0.z | R0.z | R0.w | R0.w |
| fp16 | H0.x | H0.y | H0.z | H0.w | H1.x | H1.y | H1.z | H1.w |

Table #5 show the slot interpretations for physical register 0. The slot assignments are identical for other physical registers, except that the register numbers may be R<n>, and H<2n,2n+1> for physical register <n>. In unwritten state, "all 0" means that all registers corresponding to the slot can be read and may be constant value 0.0. In unknown state, the data type may not necessarily be known and none of the registers corresponding to such a slot may be read.

The data type of each slot begins in the unwritten state. When a fragment program instruction writes to a temporary register, the data type of all slots enabled for writes is changed to match the register written. For example, a write to the "x" and "z" components of H0 may change the data types of slot 1 and slot 3 to fp16, leaving the remainder of the slots unchanged. Writes to the "x" and "z" components of R0 may change the data types of slots 1, 2, 5, and 6 to fp32.

A fragment program instruction can write to a register under the control of a run-time write mask, using the condition code register described hereinafter. Since the data found in each slot may or may not change, the data type of any slots whose current type does not match the possible new data type becomes "unknown".

When a fragment program reads from components of a temporary register, the data type of each slot accessed may match the type of the register. A fragment program may fail to load if it contains an instruction that attempts to read from a slot whose current type does not match and is not "unwritten". For example, reading R0.x may result in an error if the type of either slot 1 or slot 2 is "unknown" or fp16. Reading H1.w may result in an error is the type of slot 8 is "unknown" or fp32.

Reads of register slots whose current type is "unwritten" may not necessarily result in an error, but may return the constant value 0.0.

Fragment program instructions (other than KIL) may write their results to one of the temporary registers. There are no restrictions, other than the data type restrictions above, on the use of temporary registers in fragment program instructions.

All temporary registers are initialized to the constant values (0.0, 0.0, 0.0, 0.0). All physical register slots begin in the "unwritten" state. Temporary registers are re-initialized before processing each fragment.

In addition to the normal temporary registers, there are two temporary pseudo-registers, "RC" and "HC". RC and HC are treated as unnumbered, write-only temporary registers. The components of RC have an fp32 data type; the components of HC have an fp16 data type. The purpose of these registers is to permit instructions to modify the condition code register without overwriting any existing values in the temporary registers.

Fragment Program Output Registers

TABLE #6 illustrates fragment program output registers.

| Fragment Program Output Name | Temporary Register | Read Only | Description |
|---|---|---|---|
| o[COLR] | R0 | H0/H1 | Final RGBA fragment color, fp32 format |
| o[COLH] | H0 | R0 | Final RGBA fragment color, fp16 format |
| o[TEX0] | H0 | R0/H0 | TEXTURE0 for GL_NV_register_combiners |
| o[TEX1] | H1 | R0/H1 | TEXTURE1 for GL_NV_register_combiners |
| o[TEX2] | H2 | R1/H2 | TEXTURE2 for GL_NV_register_combiners |
| o[TEX3] | H3 | R1/H3 | TEXTURE3 for GL_NV_register_combiners |
| o[DEPR] | R1.z | H2 | Final fragment depth value, fp32 format (for color programs) |
|  | R3.z | H4 | Final fragment depth value, fp32 format (for combiner programs) |

The corresponding temporary register is listed in the "Temporary Register" column. The temporary registers named in the "Temporary Register" and "Read Only" columns become read-only after the program writes to the corresponding output register.

In one embodiment, the fragment program output registers may include logical registers used to hold the final results of the fragment program. The possible final results of a fragment program are an RGBA fragment color, a fragment depth value, and up to four texture values used by a register combiners extension such as NV_register_combiners.

The fragment program output registers are not necessarily physical registers; they instead share space with the fragment program temporary registers. Each output register listed in Table #6 has an associated temporary register listed in the "temporary register" column. Any fragment programs that write to the corresponding temporary register or any listed in the "read only" column after writing to an output register may fail to load.

Color fragment programs are used to replace the associated color of a fragment. A fragment program replaces the associated color of a fragment by writing to the COLR or COLH output registers. These two registers are identical, except for the associated data type of the components. A color fragment program may fail to load if it fails to write to either COLR or COLH, writes to both COLR and COLH, or writes to any of TEX0, TEX1, TEX2, or TEX3. The R, G, B, and A components of the fragment color are taken from the x, y, z, and w components respectively of the COLR or COLH registers.

Combiner fragment programs are used to generate the texture values used by register combiners such as GL_NV_register_combiners. If the register combiners are enabled, the initial values of the TEXTURE0_ARB, TEXTURE1_ARB, TEXTURE2_ARB, and TEXTURE3_ARB combiner registers are taken from the TEX0, TEX1, TEX2, and TEX3 output registers. The contents of any combiner register component are undefined if the corresponding output register component was not written to by the fragment program. A combiner fragment program may fail to load if it does not write to any of the TEX0, TEX1, TEX2, or TEX3 or writes to COLR or COLH. The R, G, B, and A components of the combiner registers are taken from the x, y, z, and w components of the corresponding output registers.

Fragment programs may be used to replace the original depth value of a fragment found in the "z" component of the WPOS attribute register. If a fragment program writes to the "z" component of the DEPR output register, the value written replaces the depth value of the fragment. Otherwise, the depth value of the fragment is not modified.

The fragment program output registers may not be read by a fragment program, but may be written to multiple times. The values of all output registers are undefined until they are updated by the fragment program.

Fragment Program Condition Code Register

The condition code register (CC) may be a single four-component vector. Each component of this register is one of four enumerated values: GT (greater than), EQ (equal), LT (less than), or UN (unordered). The condition code register can be used to mask writes to fragment data register components or to terminate processing of a fragment (KIL instruction). In other embodiments, there may be multiple condition codes.

Every fragment program instruction (except for KIL) can optionally update the condition code register. When a fragment program instruction updates the condition code register, a condition code component is set to LT if the corresponding component of the result is less than zero, EQ if it is equal to zero, GT if it is greater than zero, and UN if it is NaN (not a number).

The condition code register is initialized to a vector of EQ values each time a fragment program executes.

Fragment Program Parameters

In addition to using the registers defined hereinabove, fragment programs may also use fragment program parameters in their computation. Fragment program parameters are constant during the execution of fragment programs, but some parameters may be modified outside the execution of a fragment program.

There are four different types of program parameters: embedded scalar constants, embedded vector constants, named constants, and local parameters. As an option, there may also be global parameters (like local parameters but shared between all programs) in other embodiments.

Embedded scalar constants are written as standard floating-point numbers with an optional sign designator ("+" or "−") and optional scientific notation (e.g., "E+06", meaning "times 10^6").

Embedded vector constants are written as a comma-separated array of one to four scalar constants, surrounded by braces (like a C/C++ array initializer). Vector constants are treated as 4-component vectors: constants with fewer than four components are expanded to 4-components by filling missing y and z components with 0.0 and missing w components with 1.0. Thus, the vector constant "{2} " is equivalent to "{2,0,0,1}", "{3,4} " is equivalent to "{3,4,0,1}", and "{5,6,7}" is equivalent to "{5,6,7,1}".

Named constants allow fragment program instructions to define scalar or vector constants that can be referenced by name. Named constants are created using the DEFINE instruction. Note Table #7.

TABLE #7

DEFINE pi = 3.1415926535;
DEFINE color = {0.2, 0.5, 0.8, 1.0};

The DEFINE instruction associates a constant name with a scalar or vector constant value. Subsequent fragment program instructions that use the constant name are equivalent to those using the corresponding constant value.

Local parameters are similar to named vector constants, but their values can be modified after the program is loaded. Local parameters are created using the DECLARE instruction. Note Table #8.

TABLE #8

DECLARE fog_color1;
DECLARE fog_color2 = {0.3, 0.6, 0.9, 0.1};

The DECLARE instruction creates a 4-component vector associated with the local parameter name. Subsequent fragment program instructions referencing the local parameter name are processed as though the current value of the local parameter vector were specified instead of the parameter name. A DECLARE instruction can optionally specify an initial value for the local parameter, which can be either a scalar or vector constant. Scalar constants are expanded to 4-component vectors by replicating the scalar value in each component. The initial value of local parameters not initialized by the program is (0,0,0,0).

A local parameter for a specific program can be updated using various calls such as ProgramLocalParameter4fNV or ProgramLocalParameter4fvNV which will be set forth later.

Local parameters are accessible by the program in which they are defined. Modifying a local parameter affects the associated program and does not necessarily affect local parameters with the same name that are found in other fragment programs.

Constant and local parameter names can be arbitrary strings consisting of letters (upper or lower-case), numbers, and underscores ("_") Keywords defined in the grammar (including instruction names) can not necessarily be used as constant names, nor can strings that start with numbers, or strings that specify valid invalid temporary register or texture numbers (e.g., "R0"-"R15", "H0"-"H31"", "TEX0"-"TEX15"). A fragment program may fail to load if a DEFINE or DECLARE instruction specifies an invalid constant or local parameter name.

A fragment program may fail to load if an instruction refers to a named parameter not specified in a previous DEFINE or DECLARE instruction. A fragment program may also fail to load if a DEFINE or DECLARE instruction attempts to re-define a named parameter specified in a previous DEFINE or DECLARE instruction.

Fragment program instructions may optionally reference no more than one unique fragment program parameter as operands. In one embodiment, a fragment program instruction containing multiple fragment program parameters can be valid if (1) all such references specify the same local parameter, or (2) all such references specify named or embedded constants that taken together contain no more than four unique scalar values. For valid instructions referencing multiple constants, the GL automatically generates an equivalent instruction that references a single vector constant. Before counting the number of unique values, any named constants are first converted to the equivalent embedded constants. When generating a combined vector constant, the GL may, but does not necessarily, perform swizzling, component selection, negation, or absolute value operations. See Table #9.

TABLE #9

| Instruction | Equivalent Instruction |
| --- | --- |
| MAD R0, R1, 2, −1; | MAD R0, R1, {2, −1, 0, 0}.x, {2, −1, 0, 0}.y; |
| ADD R0, {1, 2, 3, 4}, 4; | ADD R0, {1, 2, 3, 4}.xyzw, {1, 2, 3, 4}.w; |

TABLE #9-continued

Invalid Instructions

ADD R0, {1, 2, 3, 4}, −4;
ADD R0, {1, 2, 3, 4}, |-4|;
ADD R0, {1, 2, 3, 4), −{−1, −2, −3, −4};
ADD R0, {1, 2, 3, 4}, {4, 5, 6, 7}.x;

Fragment Program Specification

Fragment programs are specified as an array of ubytes. The array is a string of ASCII characters encoding the program. A command such as LoadProgramNV loads a fragment program when the target parameter is FRAGMENT_PROGRAM_NV, for example. A command such as BindProgramNV enables a fragment program for execution.

At program load time, the program is parsed into a set of tokens possibly separated by white space. Spaces, tabs, newlines, carriage returns, and comments are considered whitespace. Comments begin with the character "#" and are terminated by a newline, a carriage return, or the end of the program array. Fragment programs are case-sensitive—upper and lower case letters are treated differently. The proper choice of case can be inferred from the grammar.

The Backus-Naur Form (BNF) grammar below in Table #10 specifies the syntactically valid sequences for fragment programs. The set of valid tokens can be inferred from the grammar. The token " " represents an empty string and is used to indicate optional rules. A program is invalid if it contains any undefined tokens or characters.

TABLE #10

| | |
| --- | --- |
| <program> | ::= <progPrefix> <instructionSequence> "END" |
| <progPrefix> | ::= <colorProgPrefix><br>\| <combinerProgPrefix> |
| <colorProgPrefix> | ::= "!!FP1.0" |
| <combinerProgPrefix> | ::= "!!FCP1.0" |
| <instructionSequence> | ::= <instructionSequence> <instructionStatement><br>\| <instructionStatement> |
| <instructionStatement> | ::= <instruction> ";"<br>\| <constantDefinition> ";"<br>\| <localDeclaration> ";" |
| <instruction> | ::= <VECTORop-instruction><br>\| <SCALARop-instruction><br>\| <BINSCop-instruction><br>\| <BINop-instruction><br>\| <TRIop-instruction><br>\| <KILop-instruction><br>\| <TEXop-instruction><br>\| <TXDop-instruction> |
| <VECTORop-instruction> | ::= <VECTORop> <maskedDstReg> ","<br><vectorSrc> |
| <VECTORop> | ::= "DDX" \| "DDXR" \| "DDXH" \| "DDXX"<br>\| "DDXC" \| "DDXRC" \| "DDXHC" \| "DDXXC"<br>\| "DDY" \| "DDYR" \| "DDYH" \| "DDYX"<br>\| "DDYC" \| "DDYRC" \| "DDYHC" \| "DDYXC"<br>\| "FLR" \| "FLRR" \| "FLRH" \| "FLRX"<br>\| "FLRC" \| "FLRRC" \| "FLRHC" \| "FLRXC"<br>\| "FRC" \| "FRCR" \| "FRCH" \| "FRCX"<br>\| "FRCC" \| "FRCRC" \| "FRCHC" \| "FRCXC"<br>\| "LIT" \| "LITR" \| "LITH" \| "LITX"<br>\| "LITC" \| "LITRC" \| "LITHC" \| "LITXC"<br>\| "MOV" \| "MOVR" \| "MOVH" \| "MOVX"<br>\| "MOVC" \| "MOVRC" \| "MOVHC" \| "MOVXC"<br>\| "PK2"<br>\| "PK4" |
| <SCALARop-instruction> | ::= <SCALARop> <maskedDstReg> ", "<br><scalarSrc> |
| <SCALARop> | ::= "COS" \| "COSR" \| "COSH" \| "COSX"<br>\| "COSC" \| "COSRC" \| "COSHC" \| "COSXC" |

TABLE #10-continued

```
                                | "EX2" | "EX2R" | "EX2H" | "EX2X"
                                | "EX2C" | "EX2RC" | "EX2HC" | "EX2XC"
                                | "LG2" | "LG2R" | "LG2H" | "LG2X"
                                | "LG2C" | "LG2RC" | "LG2HC" | "LG2XC"
                                | "RCP" | "RCPR" | "RCPH" | "RCPX"
                                | "RCPC" | "RCPRC" | "RCPHC" | "RCPXC"
                                | "RSQ" | "RSQR" | "RSQH" | "RSQX"
                                | "RSQC" | "RSQRC" | "RSQHC" | "RSQXC"
                                | "SIN" | "SINR" | "SINH" | "SINX"
                                | "SINC" | "SINRC" | "SINHC" | "SINXC"
                                | "UP2" | "UP2C"
                                | "UP4" | "UP4C"
<BINSCop-instruction>   ::= <BINSCop> <maskedDstReg> ","
                                <scalarSrc> "," <scalarSrc>
<BINSCop>               ::= "POW" | "POWR" | "POWH" | "POWX"
                                | "POWC" | "POWRC" | "POWHC" | "POWXC"
<BINop-instruction>     ::= <BINop> <maskedDstReg> ","
                                <vectorSrc> "," <vectorSrc>
<BINop>                 ::= "ADD" | "ADDR" | "ADDH" | "ADDX"
                                | "ADDC" | "ADDRC" | "ADDHC" | "ADDXC"
                                | "DP3" | "DP3R" | "DP3H" | "DP3X"
                                | "DP3C" | "DP3RC" | "DP3HC" | "DP3XC"
                                | "DP4" | "DP4R" | "DP4H" | "DP4X"
                                | "DP4C" |DP4RC" | "DP4HC" | "DP4XC"
                                | "DST" | "DSTR" | "DSTH" |"DSTX"
                                | "DSTC" | "DSTRC" | "DSTHC" | "DSTXC"
                                | "MAX" | "MAXR" | "MAXH" | "MAXX"
                                | "MAXC" | "MAXRC" | "MAXHC" | "MAXXC"
                                | "MIN" | "MINR" | "MINH" | "MINX"
                                | "MINC" | "MINRC" | "MINHC" | "MINXC"
                                | "MUL" | "MULR" | "MULH" | "MULX"
                                | "MULC" | "MULRC" | "MULHC" | "MULXC"
                                | "RFL" | "RFLR" | "RFLH" | "RFLX"
                                | "RFLC" | "RFLRC" | "RFLHC" | "RFLXC"
                                | "SEQ" | "SEQR" | "SEQH" | "SEQX"
                                | "SEQC" | "SEQRC" | "SEQHC" | "SEQXC"
                                | "SFL" | "SFLR" | "SFLH" | "SFLX"
                                | "SFLC" | "SFLRC" | "SFLHC" | "SFLXC"
                                | "SGE" | "SGER" | "SGEH" | "SGEX"
                                | "SGEC" | "SGERC" | "SGEHC" | "SGEXC"
                                | "SGT" | "SGTR" | "SGTH" | "SGTX"
                                | "SGTC" | "SGTRC" | "SGTHC" | "SGTXC"
                                | "SLE" | "SLER" | "SLEH" | "SLEX"
                                | "SLEC" | "SLERC" | "SLEHC" | "SLEXC"
                                | "SLT" | "SLTR" | "SLTH" | "SLTX"
                                | "SLTC" | "SLTRC" | "SLTHC" | "SLTXC"
                                | "SNE" | "SNER" | "SNEH" | "SNEX"
                                | "SNEC" | "SNERC" | "SNEHC" | "SNEXC"
                                | "STR" | "STRR" | "STRH" | "STRX"
                                | "STRC" | "STRRC" | "STRHC" | "STRXC"
                                | "SUB" | "SUBR" | "SUBH" | "SUBX"
                                | "SUBC" | "SUBRC" | "SUBHC" | "SUBXC"
<TRIop-instruction>     ::= <TRIop> <maskedDstReg> ","
                                <vectorSrc> "," <vectorSrc> ","
                                <vectorSrc>
<TRIOp>                 ::= "MAD" | "MADR" | "MADH" | "MADX"
                                | "MADC" | "MADRC" | "MADHC" | "MADXC"
                                | "LRP" | "LRPR" | "LRPH" | "LRPX"
                                | "LRPC" | "LRPRC" | "LRPHC" | "LRPXC"
<KILop-instruction>     ::= <KILop> <ccMask>
<KILop>                 ::= "KIL"
<TEXop-instruction>     ::= <TEXop> <maskedDstReg> ","
                                <vectorSrc> "," <textImageId>
<TEXop>                 ::= "TEX" | "TEXC"
                                | "TXP" | "TXPC"
<TXDop-instruction>     ::= <TXDop> <maskedDstReg> ","
                                <vectorSrc> "," <vectorSrc> ","
                                <vectorSrc> "," <texImageId>
<TXDop>                 ::= "TXD" | "TXDC"
<scalarSrc>             ::= <absScalarSrc>
                                | <baseScalarSrc>
<absScalarSrc>          ::= <negate> "|" <baseScalarSrc> "|"
<baseScalarSrc>         ::= <signedScalarConstant>
                                | <negate> <namedScalarConstant>
                                | <negate> <vectorConstant> <scalarSuffix>
                                | <negate> <namedLocalParameter>
<scalarSuffix>              | <negate> <srcRegister> <scalarSuffix>
<vectorSrc>             ::= <absVectorSrc>
                                | <baseVectorSrc>
```

TABLE #10-continued

| | | |
|---|---|---|
| <absVectorSrc> | ::= | <negate> "\|" <baseVectorSrc> "\|" |
| <baseVectorSrc> | ::= | <signedScalarConstant> |
| | | \| <negate> <namedScalarConstant> |
| | | \| <negate> <vectorConstant> <scalarSuffix> |
| | | \| <negate> <vectorConstant> <swizzleSuffix> |
| | | \| <negate> <namedLocalParameter> |
| <scalarSuffix> | | \| <negate> <namedLocalParameter> |
| <swizzleSuffix> | | \| <negate> <srcRegister> <scalarSuffix> |
| | | \| <negate> <srcRegister> <swizzleSuffix> |
| <maskedDstReg> | ::= | <dstRegister> <optionalWriteMask> <optionalCCMask> |
| <dstRegister> | ::= | <fragTempReg> |
| | | \| <fragOutputReg> |
| | | \| "RC" |
| | | \| "HC" |
| <optionalCCMask> | ::= | "(" <ccMask> ")" |
| | | \| "" |
| <ccMask> | ::= | <ccMaskRule> <swizzleSuffix> |
| | | \| <ccMaskRule> <scalarSuffix> |
| <ccMaskRule> | ::= | "EQ" \| "GE" \| "GT" \| "LE" \| "LT" \| "NE" \| "TR" \| "FL" |
| <optionalWriteMask> | ::= | "" |
| | | \| "." "x" |
| | | \| "." "y" |
| | | \| "." "x" "y" |
| | | \| "." "z" |
| | | \| "." "x" "z" |
| | | \| "." "y" "z" |
| | | \| "." "x" "y" "z" |
| | | \| "." "w" |
| | | \| "." "x" "w" |
| | | \| "." "y" "w" |
| | | \| "." "x" "y" "w" |
| | | \| "." "z" "w" |
| | | \| "." "x" "z" "w" |
| | | \| "." "y" "z" "w" |
| | | \| "." "x" "y" "z" "w" |
| <srcRegister> | ::= | <fragAttribReg> |
| | | \| <fragTempReg> |
| <fragAttribReg> | ::= | "f" "[" <fragAttribRegId> "]" |
| <fragAttribRegId> | ::= | "WPOS" \| "COL0" \| "COL1" \| "FOGC" \| "TEX0" |
| | | \| "TEX1" \| "TEX2" \| "TEX3" \| "TEX4" \| "TEX5" |
| | | \| "TEX6" \| "TEX7" |
| <fragTempReg> | ::= | <fragF32Reg> |
| | | \| <fragF16Reg> |
| <fragF32Reg> | ::= | "R0" \| "R1" \| "R2" \| "R3" |
| | | \| "R4" \| "R5" \| "R6" \| "R7" |
| | | \| "R8" \| "R9" \| "R10" \| "R11" |
| | | \| "R12" \| "R13" \| "R14" \| "R15" |
| <fragF16Reg> | ::= | "H0" \| "H1" \| "H2" \| "H3" |
| | | \| "H4" \| "H5" \| "H6" \| "H7" |
| | | \| "H8" \| "H9" \| "H10" \| "H11" |
| | | \| "H12" \| "H13" \| "H14" \| "H15" |
| | | \| "H16" \| "H17" \| "H18" \| "H19" |
| | | \| "H20" \| "H21" \| "H22" \| "H23" |
| | | \| "H24" \| "H25" \| "H26" \| "H27" |
| | | \| "H28" \| "H29" \| "H30" \| "H31" |
| <fragOutputReg> | ::= | "o" "[" <fragOutputRegName> "]" |
| <fragOutputRegName> | ::= | "COLR" \| "COLH" \| "DEPR" \| "TEX0" \| "TEX1" |
| | | \| "TEX2" \| "TEX3" |
| <scalarSuffix> | ::= | "." <component> |
| <swizzleSuffix> | ::= | "" |
| | | \| "." <component> <component> <component> <component> |
| <component> | ::= | "x" \| "y" \| "z" \| "w" |
| <texImageId> | ::= | <texImageUnit> "," <texImageTarget> |
| <texImageUnit> | ::= | "TEX0" \| "TEX1" \| "TEX2" \| "TEX3" |
| | | \| "TEX4" \| "TEX5" \| "TEX6" \| "TEX7" |
| | | \| "TEX8" \| "TEX9" \| "TEX10" \| "TEX11" |
| | | \| "TEX12" \| "TEX13" \| "TEX14" \| "TEX15" |
| <texImageTarget> | ::= | "1D" \| "2D" \| "3D" \| "CUBE" \| "RECT" |
| <constantDefinition> | ::= | "DEFINE" <namedVectorConstant> "=" <vectorConstant> |
| | | \| "DEFINE" <namedScalarConstant> "=" <scalarConstant> |
| <localDeclaration> | ::= | "DECLARE" <namedLocalParameter> <optionalLocalValue> |

TABLE #10-continued

| | | |
|---|---|---|
| <optionalLocalValue> | ::= | "" |
| | \| | "=" <vectorConstant> |
| | \| | "=" <scalarConstant> |
| <vectorConstant> | ::= | {" <vectorConstantList> "} |
| | \| | <namedVectorConstant> |
| <vectorConstantList> | ::= | <scalarConstant> |
| | \| | <scalarConstant> "," <scalarConstant> |
| | \| | <scalarConstant> "," <scalarConstant> "," <scalarConstant> |
| | \| | <scalarConstant> "," <scalarConstant> "," <scalarConstant> "," <scalarConstant> |
| <scalarConstant> | ::= | <signedScalarConstant> |
| | \| | <namedScalarConstant> |
| <signedScalarConstant> | ::= | <optionalSign> <floatConstant> |
| <namedScalarConstant> | ::= | <identifier>  ((name of a scalar constant in a DEFINE instruction)) |
| <namedVectorConstant> | ::= | <identifier>  ((name of a vector constant in a DEFINE instruction)) |
| <namedLocalParameter> | ::= | <identifier>  ((name of a local parameter in a DECLARE instruction)) |
| <negate> | ::= | "–" \| "+" \| "" |
| <optionalSign> | ::= | "–" \| "+" \| "" |
| <identifier> | ::= | see text below |
| <floatConstant> | ::= | see text below |

The <identifier> rule matches a sequence of one or more letters ("A" through "Z", "a" through "z", and "_") and digits ("0" through "9"); the first character may be a letter. The underscore ("_") counts as a letter. Upper and lower case letters are different (names are case-sensitive).

The <floatConstant> rule matches a floating-point constant consisting of an integer part, a decimal point, a fraction part, an "e" or "E", and an optionally signed integer exponent. The integer and fraction parts both consist of a sequence of on or more digits ("0" through "9"). Either the integer part or the fraction parts (not necessarily both) may be missing; either the decimal point or the "e" (or "E") and the exponent (not necessarily both) may be missing.

In some embodiments, a fragment program may fail to load if it contains more than 1024 executable instructions. Other embodiments may have different limits. Executable instructions are those matching the <instruction> rule in the grammar, and do not necessarily include DEFINE or DECLARE instructions.

A fragment program may or may not fail to load if any instruction sources more than one unique fragment attribute register.

A fragment program may or may not fail to load if any instruction sources more than one unique program parameter register.

A fragment program may or may not fail to load if it attempts to read a temporary register component whose corresponding physical register slot has an incompatible data type.

A fragment program may or may not fail to load if any instruction writes to a temporary register corresponding to an output register that was written to by a previous instruction.

A fragment program may or may not fail to load if multiple texture lookup instructions reference different targets for the same texture image unit.

A color fragment program (indicated by the "!!FP1.0" prefix) may or may not fail to load if it writes to any of the TEX0, TEX1, TEX2, or TEX3 output registers or does not write to exactly one of the COLR or COLH output registers.

A combiner fragment program (indicated by the "!!FCP1.0" prefix) may or may not fail to load if it fails to write to any of the TEX0, TEX1, TEX2, or TEX3 output registers, or writes to either of the COLR or COLH output registers.

The error INVALID_OPERATION is generated by LoadProgramNV if a fragment program fails to load because it is not syntactically correct or for one of the semantic restrictions listed above.

The error INVALID_OPERATION is generated by LoadProgramNV if a program is loaded for id when id is currently loaded with a program of a different target.

A successfully loaded fragment program is parsed into a sequence of instructions. Each instruction is identified by its tokenized name. The operation of these instructions when executed is defined hereinafter.

A successfully loaded fragment program may nonetheless be considered invalid at run time if it is incompatible with the current state of the register combiners extension (i.e. REGISTER_COMBINERS_NV) enable. A color fragment program is invalid if the register combiners extension (i.e. REGISTER_COMBINERS_NV) is enabled, and a combiner fragment program is invalid if the register combiners extension (i.e. REGISTER_COMBINERS_NV) is disabled.

Fragment Program Operation

There are forty fragment program instructions. Fragment programs may have up to eight variants, including a suffix of "R", "H", or "X" to specify arithmetic precision, and a suffix of "C" to allow an update of the condition code register. For example, the eight forms of the "ADD" instruction are "ADD", "ADDR", "ADDH", "ADDX", "ADDC", "ADDRC", "ADDHC", and "ADDXC".

The fragment program instructions and their respective input and output parameters are summarized in Table #11.

TABLE #11

| Instruction | Inputs | Output | Description |
|---|---|---|---|
| ADD[RHX] [C] | v,v | v | add |
| COS[RHX] [C] | s | ssss | cosine |
| DDX[RHX] [C] | v | v | derivative relative to x |
| DDY[RHX] [C] | v | v | derivative relative to y |
| DP3[RHX] [C] | v,v | ssss | 3-component dot product |
| DP4[RHX] [C] | v,v | ssss | 4-component dot product |

TABLE #11-continued

| Instruction | Inputs | Output | Description |
|---|---|---|---|
| DST[RHX] [C] | v,v | v | distance vector |
| EX2[RHX] [C] | s | ssss | exponential base 2 |
| FLR[RHX] [C] | v | v | floor |
| FRC[RHX] [C] | v | v | fraction |
| KIL | none | none | conditionally discard fragment |
| LG2[RHX] [C] | s | ssss | logarithm base 2 |
| LIT[RHX] [C] | v | v | compute light coefficients |
| LRP[RHX] [C] | v,v,v | v | linear interpolation |
| MAD[RHX] [C] | v,v,v | v | multiply and add |
| MAX[RHX] [C] | v,v | v | maximum |
| MIN[RHX] [C] | v,v | v | minimum |
| MOV[RHX] [C] | v | v | move |
| MUL[RHX] [C] | v,v | v | multiply |
| PK2 | v | ssss | pack two 16-bit floats |
| PK4 | v | ssss | pack four signed 8-bit values |
| POW[RHX] [C] | s,s | ssss | exponentiation (x˙y) |
| RCP[RHX] [C] | s | ssss | reciprocal |
| RFL[RHX] [C] | v,v | v | reflection vector |
| RSQ[RHX] [C] | s | ssss | reciprocal square root |
| SEQ[RHX] [C] | v,v | v | set on equal |
| SFL[RHX] [C] | v,v | v | set on false |
| SGE[RHX] [C] | v,v | v | set on greater than or equal |
| SGT[RHX] [C] | v,v | v | set on greater than |
| SIN[RHX] [C] | s | ssss | sine |
| SLE[RHX] [C] | v,v | v | set on less than or equal |
| SLT[RHX] [C] | v,v | v | set on less than |
| SNE[RHX] [C] | v,v | v | set on not equal |
| STR[RHX] [C] | v,v | v | set on true |
| SUB[RHX] [C] | v,v | v | subtract |
| TEX[C] | v | v | texture lookup |
| TXD[C] | v,v,v | v | texture lookup w/partials |
| TXP[C] | v | v | projective texture lookup |
| UP2[C] | s | v | unpack two 16-bit floats |
| UP4[C] | s | v | unpack four signed 8-bit values |

Table #11 illustrates a summary of fragment program instructions. "[RHX]" indicates an optional arithmetic precision suffix. "[C]" indicates an optional condition code update suffix. "v" indicates a 4-component vector input or output, "s" indicates a scalar input, and "ssss" indicates a scalar output replicated across a 4-component vector.

Fragment Program Storage Precision

It should be noted that the details in this entire section are specific to a single optional embodiment. Other embodiments may support different precisions and representations.

Registers in fragment program are stored in two different representations: 16-bit floating-point (fp16) and 32-bit floating-point (fp32). There is an additional 12-bit fixed-point representation (fx12) used as an internal representation for instructions with the "X" precision qualifier.

In the 32-bit float (fp32) representation, each component is represented in floating-point with eight exponent and twenty-three mantissa bits, as in the standard IEEE single-precision format. If S represents the sign (0 or 1), E represents the exponent in the range [0,255], and M represents the mantissa in the range [0,2^23−1], then an fp32 float is decoded as shown in Table #12.

TABLE #12

| | |
|---|---|
| $(-1)^S * 0.0$, | if E == 0, |
| $(-1)^S * 2^{(E-127)} * (1 + M/2^{23})$, | if 0 < E < 255, |
| $(-1)^S * INF$, | if E == 255 and M == 0, |
| NaN, | if E == 255 and M != 0. |

INF (Infinity) is a special representation indicating numerical overflow. NaN (Not a Number) is a special representation indicating the result of illegal arithmetic operations, such as division by zero. Note that all normal fp32 values, zero, and INF have an associated sign. −0.0 and +0.0 are considered equivalent for the purposes of comparisons.

This representation is similar to the IEEE single-precision floating-point standard, except that no special representation is provided for denorms—numbers in the range (−2^−126, +2^−126). All such numbers are flushed to zero.

In a 16-bit float (fp16) register, each component is represented similarly, except with five exponent and ten mantissa bits. If S represents the sign (0 or 1), E represents the exponent in the range [0,31], and M represents the mantissa in the range [0,2^10−1], then an fp32 float is decoded as shown in Table #13.

TABLE #13

| | |
|---|---|
| $(-1)^S * 0.0$, | if E == 0 and M == 0, |
| $(-1)^S * 2^{-14} * M/2^{10}$ | if E == 0 and M != 0, |
| $(-1)^S * 2^{(E-15)} * (1 + M/2^{10})$, | if 0 < E < 31, |
| $(-1)^S * INF$, | if E == 31 and M == 0, or |
| NaN, | if E == 31 and M != 0. |

One important difference is that the fp16 representation, unlike fp32, supports denorms to maximize the limited precision of the 16-bit floating point encodings.

In the 12-bit fixed-point (fx12) format, numbers are represented as signed 12-bit two's complement integers with 10 fraction bits. The range of representable values is [−2048/1024, +2047/1024].

Fragment Program Operation Precision

Fragment program instructions frequently perform mathematical operations. Such operations may be performed at one of three different precisions. Fragment programs can specify the precision of each instruction by using the precision suffix. If an instruction has a suffix of "R", calculations are carried out with 32-bit floating point operands and results. If an instruction has a suffix of "H", calculations are carried out using 16-bit floating point operands and results. If an instruction has a suffix of "X", calculations are carried out using 12-bit fixed point operands and results. For example, the instruction "MULR" performs a 32-bit floating-point multiply, "MULH" performs a 16-bit floating-point multiply, and "MULX" performs a 12-bit fixed-point multiply. If no precision suffix is specified, calculations are carried out using the precision of the temporary register receiving the result.

Fragment program instructions may source registers or constants whose precisions differ from the precision specified with the instruction. Instructions may also generate intermediate results with a different precision than that of the destination register. In these cases, the values sourced are converted to the precision specified by the instruction.

When converting to fx12 format, −INF and any values less than −2048/1024 become −2048/1024. +INF, and any values greater than +2047/1024 become +2047/1024. NaN becomes 0.

When converting to fp16 format, any values less than or equal to −2^16 are converted to −INF. Any values greater than or equal to +2^16 are converted to +INF. −INF, +INF, NaN, −0.0, and +0.0 are unchanged. Any other values that are not exactly representable in fp 16 format are converted to one of the two nearest representable values.

When converting to fp32 format, any values less than or equal to −2^128 are converted to −INF. Any values greater than or equal to +2^128 are converted to +INF. −INF, +INF, NaN, −0.0, and +0.0 are unchanged. Any other values that are not exactly representable in fp32 format are converted to one of the two nearest representable values.

Fragment program instructions using the fragment attribute registers f[FOGC] or F[TEX0] through f[TEX7] may be carried out at full fp32 precision, regardless of the precision specified by the instruction.

Fragment Program Operands

Except for KIL, fragment program instructions operate on either vector or scalar operands, indicated in the grammar by the rules <vectorSrc> and <scalarSrc> respectively.

The basic set of scalar operands is defined by the grammar rule <baseScalarSrc>. Scalar operands can be scalar constants (embedded or named), or single components of vector constants, local parameters, or registers allowed by the <srcRegister> rule. A vector component is selected by the <scalarSuffix> rule, where the characters "x", "y", "z", and "w" select the x, y, z, and w components, respectively, of the vector.

The basic set of vector operands is defined by the grammar rule <baseVectorSrc>. Vector operands can include vector constants, local parameters, or registers allowed by the <srcRegister> rule.

Basic vector operands can be swizzled according to the <swizzleSuffix> rule. In its most general form, the <swizzleSuffix> rule matches the pattern ".????" where each question mark is one of "x", "y", "z", or "w". For such patterns, the x, y, z, and w components of the operand are taken from the vector components named by the first, second, third, and fourth character of the pattern, respectively. For example, if the swizzle suffix is ".yzzx" and the specified source contains {2,8,9,0}, the swizzled operand used by the instruction is {8,9,9,2}. If the <swizzleSuffix> rule matches " ", it is treated as though it were ".xyzw".

Operands can optionally be negated according to the <negate> rule in <baseScalarSrc> or <baseVectorSrc>. If the <negate> matches "−", each value is negated.

The absolute value of operands can be taken if the <vectorSrc> or <scalarSrc> rules match <absScalarSrc> or <absVectorSrc>. In this case, the absolute value of each component is taken. In addition, if the <negate> rule in <absScalarSrc> or <absVectorSrc> matches "−", the result is then negated.

Instructions requiring vector operands can also use scalar operands in the case where the <vectorSrc> rule matches <scalarSrc>. In such cases, a 4-component vector is produced by replicating the scalar.

After operands are loaded, they are converted to a data type corresponding to the operation precision specified in the fragment program instruction.

The following pseudo-code in Table #14 spells out the operand generation process, in accordance with one embodiment.

"SrcT" and "InstT" refer to the data types of the specified register or constant and the instruction, respectively.

"VecSrcT" and "VecInstT" refer to 4-component vectors of the corresponding type.

"absolute" is TRUE if the operand matches the <absScalarSrc> or <absVectorSrc> rules, and FALSE otherwise.

"negateBase" is TRUE if the <negate> rule in <baseScalarSrc> or <baseVectorSrc> matches "−" and FALSE otherwise.

"negateAbs" is TRUE if the <negate> rule in <absScalarSrc> or <absVectorSrc> matches "−" and FALSE otherwise. The ".c***", ".*c", ".c*", ".***c" modifiers refer to the x, y, z, and w components obtained by the swizzle operation. TypeConvert() is assumed to convert a scalar of type SrcT to a scalar of type InstT using the type conversion process specified above.

TABLE #14

```
VecInstT VectorLoad(VecSrcT source)
{
    VecSrcT srcVal;
    VecInstT convertedVal;
    srcVal.x = source.c***;
    srcVal.y = source.*c**;
    srcVal.z = source.**c*;
    srcVal.w = source.***c;
    if (negateBase) {
        srcVal.x = −srcVal.x;
        srcVal.y = −srcVal.y;
        srcVal.z = −srcVal.z;
        srcVal.w = −srcVal.w;
    }
    if (absolute) {
        srcVal.x = abs(x);
        srcVal.y = abs(y);
        srcVal.z = abs(z);
        srcVal.w = abs(w);
    }
    if (negateAbs) {
        srcVal.x = −srcVal.x;
        srcVal.y = −srcVal.y;
        srcVal.z = −srcVal.z;
        srcVal.w = −srcVal.w;
    }
    convertedVal.x = TypeConvert(srcVal.x);
    convertedVal.y = TypeConvert(srcVal.y);
    convertedVal.z = TypeConvert(srcVal.z);
    convertedVal.w = TypeConvert(srcVal.w);
    return convertedVal;
}
InstT ScalarLoad(VecSrcT source)
{
    SrcT srcVal;
    InstT convertedVal;
    srcVal = source.c***;
    if (negateBase) {
        srcVal = −srcVal;
    }
    if (absolute) {
        srcVal = abs(srcVal);
    }
    if (negateAbs) {
        srcVal = −srcVal;
    }
    convertedVal = TypeConvert(srcVal);
    return convertedVal;
}
```

Fragment Program Destination Register Update

Each fragment program instruction, except for KIL, writes a 4-component result vector to a single temporary or output register. Since the instruction may be carried out at a different precision than the destination register, the components of the results vector are first converted to the data type corresponding to destination register.

Writes to individual components of the temporary register are controlled by two sets of enables: individual component write masks specified as part of the instruction and the optional condition code mask.

The component write mask is specified by the <optionalWriteMask> rule found in the <maskedDstReg> rule. If the optional mask is " ", all components are enabled. Otherwise, the optional mask names the individual components to enable. The characters "x", "y", "z", and "w" match the x, y, z, and w components respectively. For example, an optional mask of ".xzw" indicates that the x, z, and w components should be enabled for writing but the y component should not. The grammar requires that the destination register mask components may be listed in "xyzw" order.

The optional condition code mask is specified by the <optionalCCMask> rule found in the <maskedDstReg> rule. If the condition code mask is " ", all components are enabled. Otherwise, the condition code register is loaded and swizzled according to the swizzling specified by <swizzleSuffix>. Each component of the swizzled condition code is tested according to the rule given by <ccMaskRule>. <ccMaskRule> may have the values "EQ", "NE", "LT", "GE", LE", "GT" which mean to enable writes if the corresponding condition code field evaluates to equal, not equal, less than, greater than or equal, less than or equal, or greater than, respectively.

Comparisons involving condition codes of "UN" (unordered) evaluate to false. In addition, "TR" enables writes and "FL" disables writes. For example, if the condition code is (GT,LT,EQ,GT) and the condition code mask is "(NE.zyxw)", the swizzle operation may load (EQ,LT,GT, GT) and the mask may enable writes on the y, z, and w components.

Each component of the destination register is updated with the result of the fragment program if the component is enabled for writes by both the component write mask and the optional condition code mask. Otherwise, the component of the destination register remains unchanged.

A fragment program instruction can also optionally update the condition code register. The condition code is updated if the condition code register update suffix "C" is present in the instruction. The instruction "ADDC" may update the condition code; the otherwise equivalent instruction "ADD" may not. If condition code updates are enabled, each component of the destination register enabled for writes is compared to zero. The corresponding component of the condition code is set to "LT", "EQ", or "GT", if the written component is less than, equal to, or greater than zero, respectively. Note that values of −0.0 and +0.0 both evaluate to "EQ". If a component of the destination register is not enabled for writes, the corresponding condition code field is unchanged.

The following pseudocode in Table #15 illustrates the process of writing a result vector to the destination register. In the example, "ccMaskRule" refers to the condition code mask rule given by <ccMaskRule> (or " " if no rule is specified), "instrmask" refers to the component write mask given by the <optionalWriteMask> rule, and "updatecc" is TRUE if condition code updates are enabled. "destination" and "cc" refer to the register selected by <dstRegister> and the condition code, respectively.

TABLE #15

```
boolean TestCC(CondCode field) {
    switch (ccMaskRule) {
        case "EQ":  return (field == "EQ");
        case "NE":  return (field == "LT" || field == "GT");
        case "LT":  return (field == "LT");
        case "GE":  return (field == "GT" || field == "EQ");
        case "LE":  return (field == "LT" || field == "EQ");
        case "GT":  return (field == "GT");
        case "TR":  return TRUE;
        case "FL":  return FALSE;
        case " ":   return TRUE;
    }
    enum GenerateCC(DstT value) {
        if (value == −NaN || value == +NaN) {
            return UN;
        } else if (value < 0) {
            return LT;
```

TABLE #15-continued

```
        } else if (value == 0) {
            return EQ;
        } else {
            return GT;
        }
    }
    void UpdateDestination(VecDstT destination, VecInstT result)
    {
        // Load the original destination register and condition code.
        VecDstT    resultDst;
        VecDstT    merged;
        VecCC      mergedCC;
        // Convert the result to the type of the destination register.
        resultDst.x = TypeConvert(result.x);
        resultDst.y = TypeConvert(result.y);
        resultDst.z = TypeConvert(result.z);
        resultDst.w = TypeConvert(result.w);
        // Merge the converted result into the destination register, under
        // control of the compile- and run-time write masks.
        merged = destination;
        mergedCC = cc;
        if (instrMask.x && TestCC(cc.c***)) {
            merged.x = result.x;
            if (updatecc) mergedCC.x = GenerateCC(result.x);
        }
        if (instrMask.y && TestCC(cc.*c**)) {
            merged.y = result.y;
            if (updatecc) mergedCC.y = GenerateCC(result.y);
        }
        if (instrMask.z && TestCC(cc.**c*)) {
            merged.z = result.z;
            if (updatecc) mergedCC.z = GenerateCC(result.z);
        }
        if (instrMask.w && TestCC(cc.***c)) {
            merged.w = result.w;
            if (updatecc) mergedCC.w = GenerateCC(result.w);
        }
        // Write out the new destination register and result code.
        destination = merged;
        cc = mergedCC;
    }
```

Fragment Program Instruction Set

An exemplary fragment instruction set will now be set forth.

ADD: Add

The ADD instruction performs a component-wise add of the two operands to yield a result vector. See Table #16.

TABLE #16

```
tmp0 = VectorLoad(op0);
tmp1 = VectorLoad(op1);
result.x = tmp0.x + tmp1.x;
result.y = tmp0.y + tmp1.y;
result.z = tmp0.z + tmp1.z;
result.w = tmp0.w + tmp1.w;
```

The following special-case rules apply to addition:
1. "A+B" is equivalent to "B+A".
2. NaN +<x>=NaN, for all <x>.
3. +INF+<x>=+INF, for all <x> except NaN and −INF.
4. −INF+<x>=−INF, for all <x> except NaN and +INF.
5. +INF+−INF=NaN.
6. −0.0+<x>=<x>, for all <x>.
7. +0.0+<x><x>, for all <x> except −0.0.

COS: Cosine

The COS instruction approximates the cosine of the angle specified by the scalar operand and replicates the approximation to all four components of the result vector. The angle is specified in radians and does not have to be in the range [0,2*PI]. See Table #17.

TABLE #17

```
tmp = ScalarLoad(op0);
result.x = ApproxCosine(tmp);
result.y = ApproxCosine(tmp);
result.z = ApproxCosine(tmp);
result.w = ApproxCosine(tmp);
```

The approximation function ApproxCosine is accurate to at least 22 bits with an angle in the range [0,2*PI].

$|ApproxCosine(x) - cos(x)| < 1.0/2^{22}$, if $0.0 <= x < 2.0*PI$.

The error in the approximation may typically increase with the absolute value of the angle when the angle falls outside the range [0,2*PI].

The following special-case rules apply to cosine approximation:

1. ApproxCosine(NaN)=NaN.
2. ApproxCosine(+/−INF)=NaN.
3. ApproxCosine(+/−0.0)=+1.0.

DDX: Derivative Relative to X

The DDY instruction computes approximate partial derivatives of the four components of the single operand with respect to the X window coordinate to yield a result vector. The partial derivative is evaluated at the center of the pixel. See Table #18.

TABLE #18

```
f = VectorLoad(op0);
result = ComputePartialX(f);
```

It should be noted that the partial derivates obtained by this instruction are approximate, and derivative-of-derivate instruction sequences may not necessarily yield accurate second derivatives.

DDY: Derivative Relative to Y

The DDY instruction computes approximate partial derivatives of the four components of the single operand with respect to the Y window coordinate to yield a result vector. The partial derivative is evaluated at the center of the pixel. See Table #19.

TABLE #19

```
f = VectorLoad(op0);
result = ComputePartialY(f);
```

It should be noted that the partial derivates obtained by this instruction are approximate, and derivative-of-derivate instruction sequences may not necessarily yield accurate second derivatives.

DP3: 3-Component Dot Product

The DP3 instruction computes a three component dot product of the two operands (using the x, y, and z components) and replicates the dot product to all four components of the result vector. See Table #20.

TABLE #20

```
tmp0 = VectorLoad(op0);
tmp1 = VectorLoad(op1):
result.x = (tmp0.x * tmp1.x) + (tmp0.y * tmp1.y) +
           (tmp0.z * tmp2.z);
result.y = (tmp0.x * tmp1.x) + (tmp0.y * tmp1.y) +
           (tmp0.z * tmp2.z);
result.z = (tmp0.x * tmp1.x) + (tmp0.y * tmp1.y) +
           (tmp0.z * tmp2.z);
result.w = (tmp0.x * tmp1.x) + (tmp0.y * tmp1.y) +
           (tmp0.z * tmp2.z);
```

DP4: 4-Component Dot Product

The DP4 instruction computes a four component dot product of the two operands and replicates the dot product to all four components of the result vector. See Table #21.

TABLE #21

```
tmp0 = VectorLoad(op0);
tmp1 = VectorLoad(op1):
result.x = (tmp0.x * tmp1.x) + (tmp0.y * tmp1.y) +
           (tmp0.z * tmp2.z) + (tmp0.w * tmp1.w);
result.y = (tmp0.x * tmp1.x) + (tmp0.y * tmp1.y) +
           (tmp0.z * tmp2.z) + (tmp0.w * tmp1.w);
result.z = (tmp0.x * tmp1.x) + (tmp0.y * tmp1.y) +
           (tmp0.z * tmp2.z) + (tmp0.w * tmp1.w);
result.w = (tmp0.x * tmp1.x) + (tmp0.y * tmp1.y) +
           (tmp0.z * tmp2.z) + (tmp0.w * tmp1.w);
```

DST: Distance Vector The DST instruction computes a distance vector from two specially-formatted operands. The first operand should be of the form [NA, $d^2$,$d^2$, NA] and the second operand should be of the form [NA, 1/d, NA, 1/d], where NA values are not relevant to the calculation and d is a vector length. If both vectors satisfy these conditions, the result vector may be of the form [1.0, d, $d^2$, 1/d].

The behavior is specified in the following pseudo-code shown in Table #22.

TABLE #22

```
tmp0 = VectorLoad(op0);
tmp1 = VectorLoad(op1);
result.x = 1.0;
result.y = tmp0.y * tmp1.y;
result.z = tmp0.z;
result.w = tmp1.w;
```

Given an arbitrary vector, $d^2$ can be obtained using the DOT3 instruction (using the same vector for both operands) and 1/d can be obtained from $d^2$ using the RSQ instruction.

This distance vector is useful for per-fragment light attenuation calculations: a DOT3 operation involving the distance vector and an attenuation constants vector may yield the attenuation factor.

EX2: Exponential Base 2

The EX2 instruction approximates 2 raised to the power of the scalar operand and replicates it to all four components of the result vector. See Table #23.

TABLE #23

```
tmp = ScalarLoad(op0);
result.x = Approx2ToX(tmp);
result.y = Approx2ToX(tmp);
result.z = Approx2ToX(tmp);
result.w = Approx2ToX(tmp);
```

The approximation function is accurate to at least 22 bits. See Table #24.

TABLE #24

| Approx2ToX(x) − 2^x | < 1.0 / 2^22, if 0.0 <= x < 1.0,
and, in general,
| Approx2ToX(x) − 2^x | < (1.0 / 2^22) * (2^floor(x)).

The following special-case rules apply to logarithm approximation:
1. Approx2ToX(NaN)=NaN.
2. Approx2ToX(−INF)=+0.0.
3. Approx2ToX(+INF)=+INF.
4. Approx2ToX(+/−0.0)=+1.0.

FLR: Floor

The FLR instruction performs a component-wise floor operation on the operand to generate a result vector. The floor of a value is defined as the largest integer less than or equal to the value. The floor of 2.3 is 2.0; the floor of −3.6 is −4.0. See Table #25.

TABLE #25 tmp = VectorLoad(op0);
result.x = floor(tmp.x);
result.y = floor(tmp.y);
result.z = floor(tmp.z);
result.w = floor(tmp.w);

The following special-case rules apply to floor computation:
1. floor(NaN)=NaN.
2. floor(<x>)=<x>, for −0.0, +0.0, −INF, and +INF. In all cases, the sign of the result is equal to the sign of the operand.

FRC: Fraction

The FRC instruction extracts the fractional portion of each component of the operand to generate a result vector. The fractional portion of a component is defined as the result after subtracting off the floor of the component (see FLR), and is in the range [0.00, 1.00).

For negative values, the fractional portion is not the number written to the right of the decimal point—the fractional portion of −1.7 is not 0.7—it is 0.3. 0.3 is produced by subtracting the floor of −1.7 (−2.0) from −1.7. See Table #26.

TABLE #26 tmp = VectorLoad(op0);
result.x = tmp.x − floor(tmp.x);
result.y = tmp.y − floor(tmp.y);
result.z = tmp.z − floor(tmp.z);
result.w = tmp.w − floor(tmp.w);

The following special-case rules, which can be derived from the rules for FLR and ADD apply to fraction computation:
1. fraction(NaN)=NaN.
2. fraction(+/−INF)=NaN.
3. fraction(+/−0.0)=+0.0.

KIL: Conditionally Discard Fragment

The KIL instruction is unlike any other instruction in the instruction set. This instruction evaluates components of a swizzled condition code using a test expression identical to that used to evaluate condition code write masks. If any condition code component evaluates to TRUE, the fragment is discarded. Otherwise, the instruction has no effect. The condition code components are specified, swizzled, and evaluated in the same manner as the condition code write mask. See Table #27.

TABLE #27 if (TestCC(rc.c***) || TestCC(rc.*c**) ||
    TestCC(rc.**c*) || TestCC(rc.***c)) {
    // Discard the fragment.
} else {
    // Do nothing.
}

If the fragment is discarded, it is treated as though it were not produced by rasterization. In particular, none of the per-fragment operations (such as stencil tests, blends, stencil, depth, or color buffer writes) are performed on the fragment.

LG2: Logarithm Base 2

The LG2 instruction approximates the base 2 logarithm of the scalar operand and replicates it to all four components of the result vector. See Table #28.

TABLE #28 tmp = ScalarLoad(op0);
tmp = abs(tmp);
result.x = ApproxLog2(tmp);
result.y = ApproxLog2(tmp);
result.z = ApproxLog2(tmp);
result.w = ApproxLog2(tmp);

The approximation function is accurate to at least 22 bits:

|ApproxLog2(x)−log_2(x)|<1.0/2^22.

The following special-case rules apply to logarithm approximation:
1. ApproxLog2(NaN)=NaN.
2. ApproxLog2(+INF)=+INF.
3. ApproxLog2(+/−0.0)=−INF.
4. ApproxLog2(x)=NaN, −INF <x<−0.0.
5. ApproxLog2(−INF)=NaN.

LIT: Compute Light Coefficients

The LIT instruction accelerates per-fragment lighting by computing lighting coefficients for ambient, diffuse, and specular light contributions. The "x" component of the operand is assumed to hold a diffuse dot product (n dot VP_pli). The "y" component of the operand is assumed to hold a specular dot product (n dot h_i). The "w" component of the operand is assumed to hold the specular exponent of the material (s_rm).

The "x" component of the result vector receives the value that should be multiplied by the ambient light/material product (1.0). The "y" component of the result vector receives the value that should be multiplied by the diffuse light/material product (n dot VP_pli). The "z" component of the result vector receives the value that should be multiplied by the specular light/material product (f_i*(n dot h_i)^s_rm). The "w" component of the result is the constant 1.0.

Negative diffuse and specular dot products are clamped to 0.0, as is done in the standard per-vertex lighting operations. In addition, if the diffuse dot product is zero or negative, the specular coefficient is forced to zero. See Table #29.

TABLE #29

```
tmp = VectorLoad(op0);
if (t.x < 0) t.x = 0;
if (t.y < 0) t.y = 0;
result.x = 1.0;
result.y = t.x;
result.z = (t.x > 0) ? ApproxPower(t.y, t.w)
        : 0.0;
result.w = 1.0;
```

The exponentiation approximation used to compute result.z may be identical to that used in the POW instruction, including errors and the processing of any special cases.

LRP: Linear Interpolation

The LRP instruction performs a component-wise linear interpolation to yield a result vector. It interpolates between the components of the second and third operands, using the first operand as a weight. See Table #30.

TABLE #30

```
tmp0 = VectorLoad(op0);
tmp1 = VectorLoad(op1);
tmp2 = VectorLoad(op2);
result.x = tmp0.x * tmp1.x + (1 − tmp0.x) * tmp2.x;
result.y = tmp0.y * tmp1.y + (1 − tmp0.y) * tmp2.y;
result.z = tmp0.z * tmp1.z + (1 − tmp0.z) * tmp2.z;
result.w = tmp0.w * tmp1.w + (1 − tmp0.w) * tmp2.w;
tmp0
```

MAD: Multiply and Add

The MAD instruction performs a component-wise multiply of the first two operands, and then does a component-wise add of the product to the third operand to yield a result vector. See Table #31.

TABLE #31

```
tmp0 = VectorLoad(op0);
tmp1 = VectorLoad(op1);
tmp2 = VectorLoad(op2);
result.x = tmp0.x * tmp1.x + tmp2.x;
result.y = tmp0.y * tmp1.y + tmp2.y;
result.z = tmp0.z * tmp1.z + tmp2.z;
result.w = tmp0.w * tmp1.w + tmp2.w;
```

MAX: maximum

The MAX instruction computes component-wise minimums of the values in the two operands to yield a result vector. See Table #32.

TABLE #32

```
tmp0 = VectorLoad(op0);
tmp1 = VectorLoad(op1);
result.x = (tmp0.x > tmp1.x) ? tmp0.x : tmp1.x;
result.y = (tmp0.y > tmp1.y) ? tmp0.y : tmp1.y;
result.z = (tmp0.z > tmp1.z) ? tmp0.z : tmp1.z;
result.w = (tmp0.w > tmp1.w) ? tmp0.w : tmp1.w;
```

MIN: minimum

The MIN instruction computes component-wise minimums of the values in the two operands to yield a result vector. See Table #33.

TABLE #33

```
tmp0 = VectorLoad(op0);
tmp1 = VectorLoad(op1);
result.x = (tmp0.x > tmp1.x) ? tmp1.x : tmp0.x;
result.y = (tmp0.y > tmp1.y) ? tmp1.y : tmp0.y;
result.z = (tmp0.z > tmp1.z) ? tmp1.z : tmp0.z;
result.w = (tmp0.w > tmp1.w) ? tmp1.w : tmp0.w;
```

MOV: Move

The MOV instruction copies the value of the operand to yield a result vector. result=VectorLoad(op0);

MUL: Multiply

The MUL instruction performs a component-wise multiply of the two operands to yield a result vector. See Table #34.

TABLE #34

```
tmp0 = VectorLoad(op0);
tmp1 = VectorLoad(op1);
result.x = tmp0.x * tmp1.x;
result.y = tmp0.y * tmp1.y;
result.z = tmp0.z * tmp1.z;
result.w = tmp0.w * tmp1.w;
```

The following special-case rules apply to multiplication:
1. "A*B" is equivalent to "B*A".
2. NaN*<x>=NaN, for all <x>.
3. +/−0.0*<x>=+/−0.0, for all <x> except NaN. The sign of the result is positive if the signs of the two operands match and negative otherwise.
4. +/−INF*<x>=+/−INF, for all <x> except −0.0, +0.0, and NaN. The sign of the result is positive if the signs of the two operands match and negative otherwise.
5. +1.0*<x>=<x>, for all <x>.

PK2: Pack Two 16-bit Floats

The PK2 instruction converts the "x" and "y" components of the single operand into 16-bit floating-point format, packs the bit representation of these two floats into a 32-bit value, and replicates that value to all four components of the result vector. The PK2 instruction can be reversed by the UP2 instruction below. See Table #35.

TABLE #35

```
tmp0 = VectorLoad(op0);
/* result obtained by combining raw bits of tmp0.x, tmp0.y */
result.x = RawBits(tmp0.x) | (RawBits(tmp0.y) << 16);
result.y = RawBits(tmp0.x) | (RawBits(tmp0.y) << 16);
result.z = RawBits(tmp0.x) | (RawBits(tmp0.y) << 16);
result.w = RawBits(tmp0.x) | (RawBits(tmp0.y) << 16);
```

PK4: Pack Four Signed 8-bit Values

The PK4 instruction converts the four components of the single operand into 8-bit signed quantities. The signed quantities are represented in a bit pattern where all '0'. bits corresponds to −128/127 and all '1' bits corresponds to +127/127. The bit representation of the four converted components are packed into a 32-bit value, and that value is replicated to all four components of the result vector. The PK4 instruction can be reversed by the UP4 instruction below. See Table #36.

TABLE #36

```
tmp0 = VectorLoad(op0);
if (tmp0.y < -128/127) tmp0.y = -128/127;
if (tmp0.z < -128/127) tmp0.z = -128/127;
if (tmp0.w < -128/127) tmp0.w = -128/127;
if (tmp0.x > +127/127) tmp0.x = +127/127;
if (tmp0.y > +127/127) tmp0.y = +127/127;
if (tmp0.z > +127/127) tmp0.z = +127/127;
if (tmp0.w > +127/127) tmp0.w = +127/127;
ub.x = round(127.0 * tmp0.x + 128.0); /* ub is a ubyte vector */
ub.y = round(127.0 * tmp0.y + 128.0);
ub.z = round(127.0 * tmp0.z + 128.0);
ub.w = round(127.0 * tmp0.w + 128.0);
/* result obtained by combining raw bits of ub. */
result.x = ((ub.x) | (ub.y << 8) | (ub.z << 16) | (ub.w << 24));
result.y = ((ub.x) | (ub.y << 8) | (ub.z << 16) | (ub.w << 24));
result.z = ((ub.x) | (ub.y << 8) | (ub.z << 16) | (ub.w << 24));
result.w = ((ub.x) | (ub.y << 8) | (ub.z << 16) | (ub.w << 24));
```

POW: Exponentiation

The POW instruction approximates the value of the first scalar operand raised to the power of the second scalar operand and replicates it to all four components of the result vector. See Table #37.

TABLE #37

```
tmp0 = ScalarLoad(op0);
tmp1 = ScalarLoad(op1);
result.x = ApproxPower(tmp0, tmp1);
result.y = ApproxPower(tmp0, tmp1);
result.z = ApproxPower(tmp0, tmp1);
result.w = ApproxPower(tmp0, tmp1);
```

The exponentiation approximation function is defined in terms of the base 2 exponentiation and logarithm approximation operations in the EX2 and LG2 instructions, including errors and the processing of any special cases. In particular, ApproxPower(a,b)=ApproxExp2(b*ApproxLog2(a)). The following special-case rules, which can be derived from the rules in the LG2, MUL, and EX2 instructions, apply to exponentiation:

1. ApproxPower(NaN, <x>) = NaN,
2. ApproxPower(<x>, <y>) = NaN, if x <= –0.0,
3. ApproxPower(+/–0.0, <x>) = +0.0, if x > +0.0, or +INF, if x < –0.0,
4. ApproxPower(+1.0, <x>) = +1.0, if x is not NaN,
5. ApproxPower(+INF, <x>) = +INF, if x >+0.0, or +0.0, if x < –0.0,
6. ApproxPower(<x>, +/–0.0) = +1.0, if x >= –0.0
7. ApproxPower(<x>, +INF) = +0.0, if –0.0 <= x < +1.0, +INF, if x > +1.0,
8. ApproxPower(<x>, +INF) = +INF, if –0.0 <= x < +1.0, +0.0, if x > +1.0,
9. ApproxPower(<x>, +1.0) = <x>, if x >= +0.0, and
10. ApproxPower(<x>, NaN) = NaN.

It should be noted that a logarithm is involved even if the exponent is an integer. This means that any exponentiating with a negative base will produce NaN. In constrast, it is possible in a "normal" mathematical formulation to raise negative numbers to integral powers (e.g., $(-3)^2==9$, and $(-0.5)^2=4$).

RCP: Reciprocal

The RCP instruction approximates the reciprocal of the scalar operand and replicates it to all four components of the result vector. See Table #38.

TABLE #38

```
tmp = ScalarLoad(op0);
result.x = ApproxReciprocal(tmp);
result.y = ApproxReciprocal(tmp);
result.z = ApproxReciprocal(tmp);
result.w = ApproxReciprocal(tmp);
```

The approximation function is accurate to at least 22 bits:

$|ApproxReciprocal(x)-(1/x)|<1.0/2^{22}$, if $1.0<=x<2.0$.

The following special-case rules apply to reciprocation:
1. ApproxReciprocal(NaN)=NaN.
2. ApproxReciprocal(+/–INF)=+/–0.0. The sign of the result is equal to the sign of the operand.
3. ApproxReciprocal(+/–0.0)=+/–INF. The sign of the result is equal to the sign of the operand.

RFL: Reflection Vector

The RFL instruction computes the reflection of the second vector operand (the "direction" vector) about the vector specified by the first vector operand (the "axis" vector). Both operands are treated as 3D vectors (the w components are ignored). The result vector is another 3D vector (the "reflected direction" vector). The length of the result vector, ignoring rounding errors, should equal that of the second operand. See Table #39.

TABLE #39

```
axis = VectorLoad(op0);
direction = VectorLoad(op1);
tmp.w = (axis.x * axis.x + axis.y * axis.y +
   axis.z * axis.z);
tmp.x = (axis.x * direction.x + axis.y *
direction.y +
   axis.z * direction.z);
tmp.x = 2.0 * tmp.x;
tmp.x = tmp.x / tmp.w;
result.x = tmp.x * axis.x – direction.x;
result.y = tmp.x * axis.y – direction.y;
result.z = tmp.x * axis.z – direction.z;
```

The w component of the result vector is undefined.

RSQ: Reciprocal Square Root

The RSQ instruction approximates the reciprocal of the square root of the scalar operand and replicates it to all four components of the result vector. See Table #40.

TABLE #40

```
tmp = ScalarLoad(op0);
result.x = ApproxRSQRT(tmp);
result.y = ApproxRSQRT(tmp);
result.z = ApproxRSQRT(tmp);
result.w = ApproxRSQRT(tmp);
```

The approximation function is accurate to at least 22 bits:

$|ApproxRSQRT(x)-(1/x)|<1.0/2^{22}$, if $1.0<=x<4.0$.

The following special-case rules apply to reciprocal square roots:
1. ApproxRSQRT(NaN)=NaN.
2. ApproxRSQRT(+INF)=+0.0.
3. ApproxRSQRT(–INF)=NaN.
4. ApproxRSQRT(+0.0)=+INF.
5. ApproxRSQRT(–0.0)=–INF.
6. ApproxRSQRT(x)=NaN, if $-INF <x<-0.0$.

SEQ: Set on Equal To

The SEQ instruction performs a component-wise comparison of the two operands. Each component of the result vector is 1.0 if the corresponding component of the first operand is equal to that of the second, and 0.0 otherwise. See Table #41.

TABLE #41 tmp0 = VectorLoad(op0);
tmp1 = VectorLoad(op1);
result.x = (tmp0.x == tmp1.x) ? 1.0 : 0.0;
result.y = (tmp0.y == tmp1.y) ? 1.0 : 0.0;
result.z = (tmp0.z == tmp1.z) ? 1.0 : 0.0;
result.w = (tmp0.w == tmp1.w) ? 1.0 : 0.0;

SFL: Set on False

The SFL instruction is a degenerate case of the other "Set on" instructions that sets all components of the result vector to 0.0. See Table #42.

TABLE #42 result.x = 0.0;
result.y = 0.0;
result.z = 0.0;
result.w = 0.0;

SGE: Set on Greater Than or Equal

The SGE instruction performs a component-wise comparison of the two operands. Each component of the result vector is 1.0 if the corresponding component of the first operands is greater than or equal that of the second, and 0.0 otherwise. See Table #43.

TABLE #43 tmp0 = VectorLoad(op0);
tmp1 = VectorLoad(op1);
result.x = (tmp0.x >= tmp1.x) ? 1.0 : 0.0;
result.y = (tmp0.y >= tmp1.y) ? 1.0 : 0.0;
result.z = (tmp0.z >= tmp1.z) ? 1.0 : 0.0;
result.w = (tmp0.w >= tmp1.w) ? 1.0 : 0.0;

SGT: Set on Greater Than

The SGT instruction performs a component-wise comparison of the two operands. Each component of the result vector is 1.0 if the corresponding component of the first operands is greater than that of the second, and 0.0 otherwise. See Table #44.

TABLE #44 tmp0 = VectorLoad(op0);
tmp1 = VectorLoad(op1);
result.x = (tmp0.x > tmp1.x) ? 1.0 : 0.0;
result.y = (tmp0.y > tmp1.y) ? 1.0 : 0.0;
result.z = (tmp0.z > tmp1.z) ? 1.0 : 0.0;
result.w = (tmp0.w > tmp1.w) ? 1.0 : 0.0;

SIN: Sine

The SIN instruction approximates the sine of the angle specified by the scalar operand and replicates it to all four components of the result vector. The angle is specified in radians and does not have to be in the range [0,2*PI]. See Table #45.

TABLE #45 tmp = ScalarLoad(op0);
result.x = ApproxSine(tmp);
result.y = ApproxSine(tmp);
result.z = ApproxSine(tmp);
result.w = ApproxSine(tmp);

The approximation function is accurate to at least 22 bits with an angle in the range [0,2*PI].

|ApproxSine(x)−sin(x)|<1.0/2^22, if 0.0<=x<2.0*PI.

The error in the approximation may typically increase with the absolute value of the angle when the angle falls outside the range [0,2*PI].

The following special-case rules apply to cosine approximation:

1. ApproxSine(NaN)=NaN.
2. ApproxSine(+/−INF)=NaN.
3. ApproxSine(+/−0.0)=+/−0.0. The sign of the result is equal to the sign of the single operand.

SLE: Set on Less Than or Equal

The SLE instruction performs a component-wise comparison of the two operands. Each component of the result vector is 1.0 if the corresponding component of the first operand is less than or equal to that of the second, and 0.0 otherwise. See Table #46.

TABLE #46 tmp0 = VectorLoad(op0);
tmp1 = VectorLoad(op1);
result.x = (tmp0.x <= tmp1.x) ? 1.0 : 0.0;
result.y = (tmp0.y <= tmp1.y) ? 1.0 : 0.0;
result.z = (tmp0.z <= tmp1.z) ? 1.0 : 0.0;
result.w = (tmp0.w <= tmp1.w) ? 1.0 : 0.0;

SLT: Set on Less Than

The SLT instruction performs a component-wise comparison of the two operands. Each component of the result vector is 1.0 if the corresponding component of the first operand is less than that of the second, and 0.0 otherwise. See Table #47.

TABLE #47 tmp0 = VectorLoad(op0);
tmp1 = VectorLoad(op1);
result.x = (tmp0.x < tmp1.x) ? 1.0 : 0.0;
result.y = (tmp0.y < tmp1.y) ? 1.0 : 0.0;
result.z = (tmp0.z < tmp1.z) ? 1.0 : 0.0;
result.w = (tmp0.w < tmp1.w) ? 1.0 : 0.0;

SNE: Set on Not Equal

The SNE instruction performs a component-wise comparison of the two operands. Each component of the result vector is 1.0 if the corresponding component of the first operand is not equal to that of the second, and 0.0 otherwise. See Table #48.

TABLE #48 tmp0 = VectorLoad(op0);
tmp1 = VectorLoad(op1);
result.x = (tmp0.x != tmp1.x) ? 1.0 : 0.0;
result.y = (tmp0.y != tmp1.y) ? 1.0 : 0.0;

TABLE #48-continued

```
result.z = (tmp0.z != tmp1.z) ? 1.0 : 0.0;
result.w = (tmp0.w != tmp1.w) ? 1.0 : 0.0;
```

STR: Set on True

The STR instruction is a degenerate case of the other "Set on" instructions that sets all components of the result vector to 1.0. See Table #49.

TABLE #49

```
result.x = 1.0;
result.y = 1.0;
result.z = 1.0;
result.w = 1.0;
```

SUB: Subtract

The SUB instruction performs a component-wise subtraction of the second operand from the first to yield a result vector. See Table #50.

TABLE #50

```
tmp0 = VectorLoad(op0);
tmp1 = VectorLoad(op1);
result.x = tmp0.x - tmp1.x;
result.y = tmp0.y - tmp1.y;
result.z = tmp0.z - tmp1.z;
result.w = tmp0.w - tmp1.w;
```

The SUB instruction is completely equivalent to an identical ADD instruction in which the negate operator on the second operand is reversed:

1. "SUB R0, R1, R2" is equivalent to "ADD R0, R1, −R2".
2. "SUB R0, R1, −R2" is equivalent to "ADD R0, R1, R2".
3. "SUB R0, R1, |R2|" is equivalent to "ADD R0, R1, −|R2|".
4. "SUB R0, R1, −|R2|" is equivalent to "ADD R0, R1, |R2|".

TEX: Texture Lookup

The TEX instruction performs a filtered texture lookup using the texture target given by <texImageTarget> belonging to the texture image unit given by <texImageUnit>. <texImageTarget> values of "1D", "2D", "3D", "CUBE", and "RECT" correspond to the texture targets TEXTURE_1D, TEXTURE_2D, TEXTURE_3D, TEXTURE_CUBE_MAP_ARB, and TEXTURE_RECTANGLE_NV, respectively.

The (s,t,r) texture coordinates used for the lookup are the x, y, and z components of the single operand.

The texture lookup may be performed in any desired manner. LOD calculations may be performed using a implementation-dependent method to derive ds/dx, du/dy, dt/dx, dt/dy, dr/dx, and dr/dy. The mapping of filtered texture components to the components of the result vector is dependent on the base internal format of the texture and is specified in Table #51.

TABLE #51

| Base Internal Format | Result Vector Components | | | |
|---|---|---|---|---|
| | X | Y | Z | W |
| ALPHA | 0.0 | 0.0 | 0.0 | At |
| LUMINANCE | Lt | Lt | Lt | 1.0 |
| LUMINANCE_ALPHA | Lt | Lt | Lt | At |
| INTENSITY | It | It | It | It |
| RGB | Rt | Gt | Bt | 1.0 |
| RGBA | Rt | Gt | Bt | At |
| DEPTH_COMPONENT (when TEXTURE_COMPARE_SGIX is false) | 0.0 | 0.0 | 0.0 | Lt |
| DEPTH_COMPONENT (when TEXTURE_COMPARE_SGIX is true) | Lt | Lt | Lt | Lt |
| HILO_NV | HIt | LOt | 0.0 | 1.0 |
| DSDT_NV | DSt | DTt | 0.0 | 1.0 |
| DSDT_MAG_NV | DSt | DTt | MAGt | 1.0 |
| DSDT_MAG_INTENSITY_NV | DSt | DTt | MAGt | It |

Table #51 shows the mapping of filtered texel components to result vector components for the TEX instruction. 0.0 and 1.0 indicate that the corresponding constant value is written to the result vector.

The result vector is generated using the following pseudocode shown in Table #52.

TABLE #52

```
tc = VectorLoad(op0);
dx = DeriveXPartials(tc);
dy = DeriveYPartials(tc);
result = TexLookup(tc, dx, dy, texid);
```

This instruction specifies a particular texture target, ignoring the standard hierarchy of texture enables (TEXTURE_CUBE_MAP_ARB, TEXTURE_3D, TEXTURE_2D, TEXTURE_1D) used to select a texture target in unextended OpenGL®. If the specified texture target has a consistent set of images, a lookup is performed. Otherwise, the result of the instruction is the vector (0,0,0,0).

Although this instruction allows the selection of any texture target, a fragment program does not necessarily use more than one texture target for any given texture image unit.

TXD: Texture Lookup with Derivatives

The TXD instruction performs a filtered texture lookup using the texture target given by <texImageTarget> belonging to the texture image unit given by <texImageUnit>. <texImageTarget> values of "1D", "2D", "3D", "CUBE", and "RECT" correspond to the texture targets TEXTURE_LD, TEXTURE_2D, TEXTURE_3D, TEXTURE_CUBE_MAP_ARB, and TEXTURE_RECTANGLE_NV, respectively.

The (s,t,r) texture coordinates used for the lookup are the x, y, and z components of the first operand. The partial derivatives in the X direction (ds/dx, dt/dx, dr/dx) are specified by the x, y, and z components of the second operand. The partial derivatives in the Y direction (ds/dy, dt/dy, dr/dy) are specified by the x, y, and z components of the third operand.

The texture lookup in any desired manner, and the LOD calculations may be performed using the specified partial derivatives. The mapping of filtered texture components to the components of the result vector is dependent on the base internal format of the texture and is specified in Table #53.

TABLE #53

```
tc = VectorLoad(op0);
dx = VectorLoad(op1);
dy = VectorLoad(op2);
result = TexLookup(tc, dx, dy, texid);
```

This instruction specifies a particular texture target, ignoring the standard hierarchy of texture enables (TEXTURE_CUBE_MAP_ARB, TEXTURE_3D, TEXTURE_2D, TEXTURE_1D) used to select a texture target in unextended OpenGL®. If the specified texture target has a consistent set of images, a lookup is performed. Otherwise, the result of the instruction is the vector (0,0,0,0).

Although this instruction allows the selection of any texture target, a fragment program can not use more than one texture target for any given texture image unit.

TXP: Projective Texture Lookup

The TXP instruction performs a filtered texture lookup using the texture target given by <texImageTarget> belonging to the texture image unit given by <texImageUnit>. <texImageTarget> values of "1D", "2D", "3D", "CUBE", and "RECT" correspond to the texture targets TEXTURE_1D, TEXTURE_2D, TEXTURE_3D, TEXTURE_CUBE_MAP_ARB, and TEXTURE_RECTANGLE_NV, respectively.

The (s,t,r) texture coordinates used for the lookup are given by x/w, y/w, and z/w, respectively, where x, y, z, and w are the corresponding components of the operand.

The texture lookup may be performed in any desired manner. The LOD calculations may be performed using a implementation-dependent method to derive ds/dx, ds/dy, dt/dx, dt/dy, dr/dx, and dr/dy. The mapping of filtered texture components to the components of the result vector is dependent on the base internal format of the texture and is specified in Table #54.

TABLE #54

```
tc = VectorLoad(op0);
tc.x = tc.x / tc.w;
tc.y = tc.y / tc.w;
tc.z = tc.z / tc.w;
dx = DeriveXPartials(tc);
dy = DeriveYPartials(tc);
result = TexLookup(tc, dx, dy, texid);
```

This instruction specifies a particular texture target, ignoring the standard hierarchy of texture enables (TEXTURE_CUBE_MAP_ARB, TEXTURE_3D, TEXTURE_2D, TEXTURE_1D) used to select a texture target in unextended OpenGL®. If the specified texture target has a consistent set of images, a lookup is performed. Otherwise, the result of the instruction is the vector (0,0,0,0).

Although this instruction allows the selection of any texture target, a fragment program does not necessarily use more than one texture target for any given texture image unit.

UP2: Unpack Two 16-Bit Floats

The UP2 instruction unpacks two 16-bit floats stored together in a 32-bit scalar operand. The first 16-bit float (stored in the 16 least significant bits) is written into the "x" and "z" components of the result vector; the second is written into the "y" and "w" components of the result vector.

This operation undoes the type conversion and packing performed by the PK2 instruction. See Table #55.

TABLE #55

```
tmp = ScalarLoad(op0);
result.x = (fp16) (RawBits(tmp) & 0xFFFF);
result.y = (fp16) ((RawBits(tmp) >> 16) & 0xFFFF);
result.z = (fp16) (RawBits(tmp) & 0xFFFF);
result.w = (fp16) ((RawBits(tmp) >> 16) & 0xFFFF);
```

The scalar operand may be loaded from a 32-bit temporary register. A fragment program may fail to load if any other register type is specified.

UP4: Unpack Four Signed 8-Bit Values

The UP4 instruction unpacks four 8-bit signed values packed together in a 32-bit scalar operand. The signed quantities are encoded where a bit pattern of all '0' bits corresponds to −128/127 and a pattern of all '1' bits corresponds to +127/127. The "x" component of the result vector is the converted value corresponding to the 8 least significant bits of the operand; the "w" component corresponds to the 8 most significant bits.

This operation undoes the type conversion and packing performed by the PK4 instruction. See Table #56.

TABLE #56

```
tmp = ScalarLoad(op0);
result.x = (((RawBits(tmp) >> 0) & 0xFF) − 128) / 127.0;
result.y = (((RawBits(tmp) >> 8) & 0xFF) − 128) / 127.0;
result.z = (((RawBits(tmp) >> 16) & 0xFF) − 128) / 127.0;
result.w = (((RawBits(tmp) >> 24) & 0xFF) − 128) / 127.0;
```

The scalar operand may be loaded from a 32-bit temporary register. A fragment program may fail to load if any other register type is specified.

Fragment Program Outputs

Upon completion of fragment program execution, the output registers are used to replace the fragment's associated data.

For color fragment programs, the RGBA color of the fragment is taken from the output register (COLR or COLH). The R, G, B, and A color components are extracted from the "x", "y", "z", and "w" components, respectively, of the output register and are clamped to the range [0,1].

For combiner fragment programs, the RGBA texture colors corresponding to the TEXTURE0_ARB, TEXTURE1_ARB, TEXTURE2_ARB, and TEXTURE3_ARB combiner registers are taken from the TEX0, TEX1, TEX2, and TEX3 output registers, respectively. Any components of the TEX0, TEX1, TEX2, or TEX3 output registers that are not written to by the fragment program are undefined. The R, G, B, and A texture color components are extracted from the "x", "y", "z", and "w" output register components, respectively, and are clamped to the range [−1,+1].

If the DEPR output register is written by the fragment program, the depth value of the fragment is taken from the z component of the DEPR output register and is clamped to the range [0,1]. Otherwise, the depth value associated with the fragment is unchanged.

Required Fragment Program State

The state required for managing fragment programs consists of: a bit indicating whether or not fragment program mode is enabled; an unsigned integer naming the currently bound fragment program and the state that may be maintained to indicate which integers are currently in use as fragment program names.

Fragment program mode may be initially disabled. The initial state of all 128 fragment program parameter registers is (0,0,0,0). The initial currently bound fragment program is zero.

Each fragment program object consists of a target, a boolean indicating whether the program is resident, an array of type ubyte containing the program string, an integer representing the length of the program string array, and one four-component floating-point vector for each local parameter. Initially, no program objects exist.

Additionally, the state required during the execution of a fragment program consists of: twelve 4-component floating-point fragment attribute registers, sixteen 128-bit physical temporary registers, and a single 4-component condition code, whose components have one of four values (LT, EQ, GT, or UN).

Each time a fragment program is executed, the fragment attribute registers are initialized with the fragment's location and associated data, all temporary register components are initialized to zero, and all condition code components are initialized to EQ.

Programs

Programs are specified as an array of ubytes used to control the operation of portions of the GL. The array is a string of ASCII characters encoding the program.

The command

```
LoadProgramNV(enum target, uint id, sizei len, const ubyte *program);
``` loads a program. The target parameter specifies the type of program loaded and can be any program (i.e. VERTEX_PROGRAM_NV, VERTEX_STATE_PROGRAM_NV, or FRAGMENT_PROGRAM_NV). A vertex program such as VERTEX_PROGRAM_NV specifies a program to be executed in vertex program mode as each vertex is specified. A vertex state program such as VERTEX_STATE_PROGRAM specifies a program to be run manually to update vertex state. A fragment program such as FRAGMENT_PROGRAM specifies a program to be executed in fragment program mode as each fragment is rasterized.

Multiple programs can be loaded with different names. id names the program to load. The name space for programs is the set of positive integers (zero is reserved). The error INVALID_VALUE is generated by LoadProgramNV if a program is loaded with an id of zero. The error INVALID_OPERATION is generated by LoadProgramNV or if a program is loaded for an id that is currently loaded with a program of a different program target. program is a pointer to an array of ubytes that represents the program being loaded. The length of the array in ubytes is indicated by len.

At program load time, the program is parsed into a set of tokens possibly separated by white space. Spaces, tabs, newlines, carriage returns, and comments are considered whitespace. Comments begin with the character "#" and are terminated by a newline, a carriage return, or the end of the program array. Tokens are processed in a case-sensitive manner: upper and lower-case letters are not considered equivalent.

Each program target has a corresponding Backus-Naur Form (BNF) grammar specifying the syntactically valid sequences for programs of the specified type. The set of valid tokens can be inferred from the grammar. The token " " represents an empty string and is used to indicate optional rules. A program is invalid if it contains any undefined tokens or characters.

The error INVALID_OPERATION is generated by LoadProgramNV if a program may or may not fail to load because it is not syntactically correct or fails to satisfy all of the semantic restrictions corresponding to the program target.

A successfully loaded program is parsed into a sequence of instructions. Each instruction is identified by its tokenized name. The operation of these instructions is specific to the program target and is defined elsewhere.

A successfully loaded program replaces the program previously assigned to the name specified by id. If the OUT_OF_MEMORY error is generated by LoadProgramNV, no change is made to the previous contents of the named program.

Querying a value of PROGRAM_ERROR_POSITION_NV returns a ubyte offset into the program string most recently passed to LoadProgramNV indicating the position of the first error, if any, in the program. If the program may or may not fail to load because of a semantic restriction that cannot be determined until the program is fully scanned, the error position may be len, the length of the program. If the program loads successfully, the value of PROGRAM_ERROR_POSITION_NV is assigned the value negative one.

For targets whose programs are executed automatically (e.g., vertex and fragment programs), there may be a current program. The current vertex program is executed automatically in vertex program mode as vertices are specified. The current fragment program is executed automatically in fragment program mode as fragments are generated by rasterization. Current programs for a program target are updated by

```
BindProgramNV(enum target, uint id);
``` where target may be VERTEX_PROGRAM_NV or FRAGMENT_PROGRAM_NV. The error INVALID_OPERATION is generated by BindProgramNV if id names a program that has a type different than target (for example, if id names a vertex state program.

Binding to a nonexistent program id does not necessarily generate an error. In particular, binding to program id zero does not necessarily generate an error. However, because program zero cannot be loaded, program zero is nonexistent. If a program id is successfully loaded with a new vertex program and id is also the currently bound vertex program, the new program is considered the currently bound vertex program.

The INVALID_OPERATION error is generated when both vertex program mode is enabled and Begin is called (or when a command that performs an implicit Begin is called) if the current vertex program is nonexistent or not valid.

The INVALID_OPERATION error is generated when both fragment program mode is enabled and Begin, another GL command that performs an implicit Begin, or any other GL command that generates fragments is called, if the current fragment program is nonexistent or not valid. A fragment program may be invalid for various reasons.

Programs are deleted by calling

```
void DeleteProgramsNV(sizei n, const uint *ids);
``` ids contains n names of programs to be deleted. After a program is deleted, it becomes nonexistent, and its name is again unused. If a program that is currently bound is deleted, it is as though BindProgramNV has been executed with the same target as the deleted program and program zero. Unused names in ids are silently ignored, as is the value zero.

The command

```
void GenProgramsNV(sizei n, uint *ids);
``` returns n currently unused program names in ids. These names are marked as used, for the purposes of GenProgramsNV, but they become existent programs when the are first loaded using LoadProgramNV.

An implementation may choose to establish a working set of programs on which binding and/or manual execution are performed with higher performance. A program that is currently part of this working set is said to be resident.

The command

```
boolean AreProgramsResidentNv(sizei n, const uint *ids, boolean
   *residences);
``` returns TRUE if all of the n programs named in ids are resident, or if the implementation does not distinguish a working set. If at least one of the programs named in ids is not resident, then FALSE is returned, and the residence of each program is returned in residences. Otherwise the contents of residences are not changed. If any of the names in ids are nonexistent or zero, FALSE is returned, the error INVALID_VALUE is generated, and the contents of residences are indeterminate. The residence status of a single named program can also be queried by calling a command such as GetProgramivNV with id set to the name of the program and pname set to PROGRAM_RESIDENT_NV.

AreProgramsResidentNV indicates whether a program is currently resident, not whether it could not be made resident. An implementation may choose to make a program resident on first use, for example. The client may guide the GL implementation in determining which programs should be resident by requesting a set of programs to make resident.

The command

```
void RequestResidentProgramsNV(sizei n, const uint *ids);
``` requests that the n programs named in ids should be made resident. While all the programs are not guaranteed to become resident, the implementation should make a best effort to make as many of the programs resident as possible. As a result of making the requested programs resident, program names not among the requested programs may become non-resident. Higher priority for residency should be given to programs listed earlier in the ids array. RequestResidentProgramsNV silently ignores attempts to make resident nonexistent program names or zero. AreProgramsResidentNV can be called after RequestResidentProgramsNV to determine which programs actually became resident.

The commands

```
void ProgramLocalParameter4fNV(uint id, sizei len, const ubyte
   *name, float x, float y, float z, float w);
void ProgramLocalparameter4dNV(uint id, sizei len, const ubyte
   *name, double x, double y, double z, double w);
void ProgramLocalParameter4fvNV(uint id, sizei len, const
   ubyte *name, const float v[ ]);
void ProgramLocalParameter4dvNV(uint id, sizei len, const
   ubyte *name,
      const double v[ ]);
``` specify a new value for the program local parameter named <name> belonging to the fragment program specified by <id>. <name> is a pointer to an array of ubytes holding the parameter name. <len> specifies the number of ubytes in the array given by <name>. The new x, y, z, and w components of the local parameter are given by x, y, z, and w, respectively, for ProgramLocalParameter4fNV and ProgramLocalParameter4dNV, and by v[0], v[1], v[2], and v[3], respectively, for ProgramLocalParameter4fvNV and ProgramLocalParameter4dvNV. The error INVALID_OPERATION is generated if <id> specifies a nonexistent program or a program whose type does not support local parameters. The error INVALID_VALUE error is generated if <name> does not specify the name of a local parameter in the program corresponding to <id>. The error INVALID_VALUE is also generated if <len> is zero.

State and State Requests

The commands

```
void GetProgramLocalParameterfvNV(uint id, sizei len, const
   ubyte *name, float *params);
void GetProgramLocalParameterdvNV(uint id, sizei len, const
   ubyte *name, double *params);
``` obtain the current program local parameter value for the parameter named <name> belonging to the program given by <id>. <name> is a pointer to an array of ubytes holding the parameter name. <len> specifies the number of ubytes in the array given by <name>. The error INVALID_OPERATION is generated if <id> specifies a nonexistent program or a program whose type does not support local parameters. The error INVALID_VALUE is generated if <name> does not specify the name of a local parameter in the program corresponding to <id>. The error INVALID_VALUE is also generated if <len> is zero. Each program local parameter is an array of four values.

The command

```
void GetProgramivNV(uint id, enum pname, int *params);
``` obtains program state named by pname for the program named id in the array params. pname may be one of PROGRAM_TARGET_NV, PROGRAM_LENGTH_NV, or PROGRAM_RESIDENT_NV. The INVALID_OPERATION error is generated if the program named id does not exist.

The command

```
void GetProgramStringNV(uint id, enum pname,ubyte *program);
``` obtains the program string for program id. pname may be PROGRAM_STRING_NV. n ubytes are returned into the array program where n is the length of the program in ubytes. GetProgramivNV with PROGRAM_LENGTH_NV can be used to query the length of a program's string. The INVALID_OPERATION error is generated if the program named id does not exist.

The command

```
boolean IsProgramNV(uint id);
``` returns TRUE if program is the name of a program object. If program is zero or is a non-zero value that is not the name of a program object, or if an error condition occurs, IsProgramNV returns FALSE. A name returned by GenProgramsNV but not yet loaded with a program is not the name of a program object."

Mutlitexture

In OpenGL® 1.2.1, multiple texture units are supported, where each set of texture coordinates can be used to access the corresponding texture image. Programmable fragment processing breaks the correspondence of texture coordinates and texture images by allowing programs to access texture images multiple times with arbitrary texture coordinates. In this environment, there need not be a one-to-one correspondence between texture coordinate sets and texture images.

Multiple sets of texture coordinates may be used to specify how multiple texture images are mapped onto a primitive. The number of texture coordinate sets supported is implementation dependent, but may be at least 1. The number of texture coordinate sets supported may be queried with the state MAX_TEXTURE_COORDS_NV.

Implementations may support more than one set of texture coordinates. The commands

```
void MultiTexCoord{1234} {sifd}ARB(enum texture, T coords)
void MultiTexCoord{1234} {sifd}vARB(enum texture, T coords)
``` take the coordinate set to be modified as the <texture> parameter. <texture> is a symbolic constant of the form TEXTUREi_ARB, indicating that texture coordinate set i is to be modified. The constants obey TEXTUREi_ARB=TEXTURE0_ARB+i (i is in the range 0 to k-1, where k is the implementation dependent number of texture units defined by MAX_TEXTURE_COORDS_NV).

The client may specify up to 5 plus the value of MAX_TEXTURE_COORDS_NV arrays; one each to store vertex coordinates.

In implementations which support more than one texture coordinate set, the command

```
void ClientActiveTextureARB(enum texture)
``` is used to select the vertex array client state parameters to be modified by the TexCoordPointer command and the array affected by EnableClientState and DisableClientState with the parameter TEXTURE_COORD_ARRAY. This command sets the state variable CLIENT_ACTIVE_TEXTURE_ARB. Each texture coordinate set has a client state vector which is selected when this command is invoked. This state vector also includes the vertex array state. This command also selects the texture coordinate set state used for queries of client state.

It should be noted that supported texture units refer to supported texture coordinate sets, in accordance with the present embodiment.

The command

```
void ActiveTextureARB(enum texture);
``` specifies the active texture unit selector, ACTIVE_TEXTURE_ARB. Each texture unit contains up to two distinct sub-units: a texture coordinate processing unit (consisting of a texture matrix stack and texture coordinate generation state) and a texture image unit. In implementations with a different number of supported texture coordinate sets and texture image units, some texture units may consist of one of the two sub-units.

The active texture unit selector specifies the texture unit accessed by commands involving texture coordinate processing. Such commands include those accessing the current matrix stack (if MATRIX_MODE is TEXTURE), TexGen, Enable/Disable (if any texture coordinate generation enum is selected), as well as queries of the current texture coordinates and current raster texture coordinates. If the texture unit number corresponding to the current value of ACTIVE_TEXTURE_ARB is greater than or equal to the implementation dependent constant MAX_TEXTURE_COORD_SETS_NV, the error INVALID_OPERATION is generated by any such command.

The active texture unit selector also selects the texture unit accessed by commands involving texture image processing. Such commands include all variants of TexEnv, TexParameter, and TexImage commands, BindTexture, Enable/Disable for any texture target (e.g., TEXTURE_2D), and queries of all such state. If the texture unit number corresponding to the current value of ACTIVE_TEXTURE_ARB is greater than or equal to the implementation dependent constant MAX_TEXTURE_IMAGE_UNITS_NV, the error INVALID_OPERATION is generated by any such command.

ActiveTextureARB generates the error INVALID_ENUM if an invalid <texture> is specified. <texture> is a symbolic constant of the form TEXTUREi_ARB, indicating that texture unit i is to be modified. The constants obey TEXTUREi_ARB=TEXTURE0_ARB+i (i is in the range 0 to k-1, where k is the larger of the MAX_TEXTURE_COORDS_NV and MAX_TEXTURE_IMAGE_UNITS_NV).

For compatibility with old OpenGL® specifications, the implementation dependent constant MAX_TEXTURE_UNITS_ARB specifies the number of conventional texture units supported by the implementation. Its value may be no larger than the minimum of MAX_TEXTURE_COORD-S_NV and MAX_TEXTURE_IMAGE_UNITS_NV.

Texturing is enabled and disabled individually for each texture unit. If texturing is disabled for one of the units, then the fragment resulting from the previous unit is passed unaltered to the following unit. Individual texture units beyond those specified by MAX_TEXTURE_UNITS_ARB may be incomplete and are treated as disabled.

Queries of texture state variables corresponding to texture coordinate processing unit (namely, TexGen state and enables, and matrices) may produce an INVALID_OPERATION error if the value of ACTIVE_TEXTURE_ARB is greater than or equal to MAX_TEXTURE_COORDS_NV. All other texture state queries may result in an INVALID_OPERATION error if the value of ACTIVE_TEXTURE_ARB is greater than or equal to MAX_TEXTURE_IMAGE_UNITS_NV.

AGL/GLX/WGL Specifications

When using OpenGL® under various windowing [o]systems, it is possible for an application to create multiple rendering contexts that can operate independently. It is possible for multiple contexts to share certain resources, including display lists and texture objects. In this environment, contexts that share display lists and texture objects will also share program objects.

GLX Protocol

Table #57 illustrates seven rendering commands are sent to the sever as part of a glXRender request.

TABLE #57

| | | |
|---|---|---|
| colspan=3 | BindProgramNV | |
| 4 | 12 | rendering command length |
| 2 | ???? | rendering command opcode |
| 4 | ENUM | target |
| 4 | CARD32 | id |
| | RequestResidentProgramsNV | |
| 2 | 8+4*n | rendering command length |
| 2 | ???? | rendering command opcode |
| 4 | INT32 | n |
| n*4 | CARD32 | programs |
| | LoadProgramNV | |
| 2 | 16+n+p | rendering command length |
| 2 | ???? | rendering command opcode |
| 4 | ENUM | target |
| 4 | CARD32 | id |
| 4 | INT32 | len |
| n | LISTofCARD8 | n |
| p | | unused, p=pad(n) |
| | ProgramParameter4fvNV | |
| 2 | 32 | rendering command length |
| 2 | ???? | rendering command opcode |
| 4 | ENUM | target |
| 4 | CARD32 | index |
| 4 | FLOAT32 | params[0] |
| 4 | FLOAT32 | params[1] |
| 4 | FLOAT32 | params[2] |
| 4 | FLOAT32 | params[3] |
| | ProgramParameter4dvNV | |
| 2 | 44 | rendering command length |
| 2 | ???? | rendering command opcode |
| 4 | ENUM | target |
| 4 | CARD32 | index |
| 8 | FLOAT64 | params[0] |
| 8 | FLOAT64 | params[1] |
| 8 | FLOAT64 | params[2] |
| 8 | FLOAT64 | params[3] |

TABLE #57-continued

| | | |
|---|---|---|
| | ProgramParameters4fvNV | |
| 2 | 16+16*n | rendering command length |
| 2 | ???? | rendering command opcode |
| 4 | ENUM | target |
| 4 | CARD32 | index |
| 4 | CARD32 | n |
| 16*n | FLOAT32 | params |
| | ProgramParameters4dvNV | |
| 2 | 16+32*n | rendering command length |
| 2 | ???? | rendering command opcode |
| 4 | ENUM | target |
| 4 | CARD32 | index |
| 4 | CARD32 | n |
| 32*n | FLOAT64 | params |
| | ProgramLocalParameter4fvNV | |
| 2 | 24+n+p | rendering command length |
| 2 | ???? | rendering command opcode |
| 4 | CARD32 | id |
| 4 | FLOAT32 | params[0] |
| 4 | FLOAT32 | params[1] |
| 4 | FLOAT32 | params[2] |
| 4 | FLOAT32 | params[3] |
| n | LISTofCARD8 | name |
| p | | unused, p=pad(n) |
| | ProgramLocalParameter4dvNV | |
| 2 | 40+n+p | rendering command length |
| 2 | ???? | rendering command opcode |
| 4 | CARD32 | id |
| 4 | FLOAT64 | params[0] |
| 4 | FLOAT64 | params[1] |
| 4 | FLOAT64 | params[2] |
| 4 | FLOAT64 | params[3] |
| n | LISTofCARD8 | name |
| p | | unused, p=pad(n) |

The remaining eight commands are non-rendering commands. These commands are sent separately (i.e., not as part of a glXRender or glXRenderLarge request), using the glXVendorPrivateWithReply request: Note Table #58.

TABLE #58

| | | |
|---|---|---|
| | AreProgramsResidentNV | |
| 1 | CARD8 | opcode (X assigned) |
| 1 | 17 | GLX opcode (glXVendorPrivateWithReply) |
| 2 | 4+n | request length |
| 4 | ???? | vendor specific opcode |
| 4 | GLX_CONTEXT_TAG | context tag |
| 4 | INT32 | n |
| n*4 | LISTofCARD32 | programs |
| | => | |
| 1 | 1 | reply |
| 1 | | unused |
| 2 | CARD16 | sequence number |
| 4 | (n+p)/4 | reply length |
| 4 | BOOL32 | return value |
| 20 | | unused |
| n | LISTofBOOL | programs |
| p | | unused, p=pad(n) |
| | DeleteProgramsNV | |
| 1 | CARD8 | opcode (X assigned) |
| 1 | 17 | GLX opcode (glXVendorPrivateWithReply) |
| 2 | 4+n | request length |
| 4 | ???? | vendor specific opcode |
| 4 | GLX_CONTEXT_TAG | context tag |
| 4 | INT32 | n |
| n*4 | LISTofCARD32 | programs |

TABLE #58-continued

GenProgramsNV

| | | |
|---|---|---|
| 1 | CARD8 | opcode (X assigned) |
| 1 | 17 | GLX opcode (glXVendorPrivateWithReply) |
| 2 | 4 | request length |
| 4 | ???? | vendor specific opcode |
| 4 | GLX_CONTEXT_TAG | context tag |
| 4 | INT32 | n |
| | => | |
| 1 | 1 | reply |
| 1 | | unused |
| 2 | CARD16 | sequence number |
| 4 | n | reply length |
| 24 | | unused |
| n*4 | LISTofCARD322 | programs |

GetProgramParameterfvNV

| | | |
|---|---|---|
| 1 | CARD8 | opcode (X assigned) |
| 1 | 17 | GLX opcode (glXVendorPrivateWithReply) |
| 2 | 6 | request length |
| 4 | ???? | vendor specific opcode |
| 4 | GLX_CONTEXT_TAG | context tag |
| 4 | ENUM | target |
| 4 | CARD32 | index |
| 4 | ENUM | pname |
| | => | |
| 1 | 1 | reply |
| 1 | | unused |
| 2 | CARD16 | sequence number |
| 4 | m | reply length, m=(n==1?0:n) |
| 4 | | unused |
| 4 | CARD32 | n |
| | if (n=1) this follows: | |
| 4 | FLOAT32 | params |
| 12 | | unused |
| | otherwise this follows: | |
| 16 | | unused |
| n*4 | LISTofFLOAT32 | params |

GetProgramParameterdvNV

| | | |
|---|---|---|
| 1 | CARD8 | opcode (X assigned) |
| 1 | 17 | GLX opcode (glXVendorPrivateWithReply) |
| 2 | 6 | request length |
| 4 | ???? | vendor specific opcode |
| 4 | GLX_CONTEXT_TAG | context tag |
| 4 | ENUM | target |
| 4 | CARD32 | index |
| 4 | ENUM | pname |
| | => | |
| 1 | 1 | reply |
| 1 | | unused |
| 2 | CARD16 | sequence number |
| 4 | m | reply length, m=(n==1?0:n*2) |
| 4 | | unused |
| 4 | CARD32 | n |
| | if (n=1) this follows: | |
| 8 | FLOAT64 | params |
| 8 | | unused |
| | otherwise this follows: | |
| 16 | | unused |
| n*8 | LISTofFLOAT64 | params |

ProgramLocalParameter4fvNV

| | | |
|---|---|---|
| 2 | 24+n+p | rendering command length |
| 2 | ???? | rendering command opcode |
| 4 | CARD32 | id |
| 4 | FLOAT32 | params[0] |
| 4 | FLOAT32 | params[1] |
| 4 | FLOAT32 | params[2] |
| 4 | FLOAT32 | params[3] |
| n | LISTofCARD8 | name |
| p | | unused, p=pad(n) |

GetProgramivNV

| | | |
|---|---|---|
| 1 | CARD8 | opcode (X assigned) |
| 1 | 17 | GLX opcode (glXVendorPrivateWithReply) |
| 2 | 5 | request length |
| 4 | ???? | vendor specific opcode |
| 4 | GLX_CONTEXT_TAG | context tag |
| 4 | CARD32 | id |
| 4 | ENUM | pname |
| | => | |
| 1 | 1 | reply |
| 1 | | unused |
| 2 | CARD16 | sequence number |
| 4 | m | reply length, m=(n==1?0:n) |
| 4 | | unused |
| 4 | CARD32 | n |
| | if (n=1) this follows: | |
| 4 | INT32 | params |
| 12 | | unused |
| | otherwise this follows: | |
| 16 | | unused |
| n*4 | LISTofINT32 | params |

GetProgramStringNV

| | | |
|---|---|---|
| 1 | CARD8 | opcode (X assigned) |
| 1 | 17 | GLX opcode (glXVendorPrivateWithReply) |
| 2 | 5 | request length |
| 4 | ???? | vendor specific opcode |
| 4 | GLX_CONTEXT_TAG | context tag |
| 4 | CARD32 | id |
| 4 | ENUM | pname |
| | => | |
| 1 | 1 | reply |
| 1 | | unused |
| 2 | CARD16 | sequence number |
| 4 | (n+p)/4 | reply length |
| 4 | | unused |
| 4 | CARD32 | n |
| 16 | | unused |
| n | STRING | program |
| p | | unused, p=pad(n) |

IsProgramNV

| | | |
|---|---|---|
| 1 | CARD8 | opcode (X assigned) |
| 1 | 17 | GLX opcode (glXVendorPrivateWithReply) |
| 2 | 4 | request length |
| 4 | ???? | vendor specific opcode |
| 4 | GLX_CONTEXT_TAG | context tag |
| 4 | INT32 | n |
| | => | |
| 1 | 1 | reply |
| 1 | | unused |
| 2 | CARD16 | sequence number |
| 4 | 0 | reply length |
| 4 | BOOL32 | return value |
| 20 | | unused |

Table #59 illustrates a plurality of errors that may be relevant in the context of the present embodiment.

TABLE #59

INVALID_OPERATION is generated by Begin, DrawPixels, Bitmap,
CopyPixels, or a command that performs an explicit Begin if
FRAGMENT_PROGRAM_NV is enabled and the currently bound fragment
program does not exist.
INVALID_OPERATION is generated by Begin, DrawPixels, Bitmap,
CopyPixels, or a command that performs an explicit Begin if
FRAGMENT_PROGRAM_NV is enabled, REGISTER_COMBINERS_NV is disabled,
and the currently bound fragment program writes to the TEX0, TEX1,
TEX2, or TEX3 output registers.
INVALID_OPERATION is generated by Begin, DrawPixels, Bitmap,
CopyPixels, or a command that performs an explicit Begin if
FRAGMENT_PROGRAM_NV is enabled, REGISTER_COMBINERS_NV is enabled,
and the currently bound fragment program does not write to the TEX0,
TEX1, TEX2, or TEX3 output registers.
INVALID_OPERATION is generated by ProgramLocalParameter4fNV,
ProgramLocalParameter4dNV, ProgramLocalParameter4fvNV,
ProgramLocalParameter4dvNV, GetProgramLocalParameterfvNV, or
GetProgramLocalParameterdvNV if <id> specifies a nonexistent program
or a program whose type does not support local parameters.
INVALID_VALUE is generated by ProgramLocalParameter4fNV,
ProgramLocalParameter4dNV, ProgramLocalParameter4fvNV,
ProgramLocalParameter4dvNV, GetProgramLocalParameterfvNV, or
GetProgramLocalParameterdvNV if <len> is zero.
INVALID_VALUE is generated by ProgramLocalParameter4fNV,
ProgramLocalParameter4dNV, ProgramLocalParameter4fvNV,
ProgramLocalParameter4dvNV, GetProgramLocalParameterfvNV, or
GetProgramLocalParameterdvNV if <name> does not specify the name of
a local parameter in the program corresponding to <id>.
INVALID_OPERATION is generated by any command accessing texture
coordinate processing state if the texture unit number corresponding
to the current value of ACTIVE_TEXTURE_ARB is greater than or equal
to the implementation dependent constant MAX_TEXTURE_COORD_SETS_NV.
INVALID_OPERATION is generated by any command accessing texture
image processing state if the texture unit number corresponding to
the current value of ACTIVE_TEXTURE_ARB is greater than or equal to
the implementation dependent constant MAX_TEXTURE_IMAGE_UNITS_NV.
The following are error descriptions.
INVALID_VALUE is generated by LoadProgramNV if id is zero.
INVALID_OPERATION is generated by LoadProgramNV if the program
corresponding to id is currently loaded but has a program type
different from that given by target.
INVALID_OPERATION is generated by LoadProgramNV if the program
specified is syntactically incorrect for the program type specified
by target. The value of PROGRAM_ERROR_POSITION_NV is still updated
when this error is generated.
INVALID_OPERATION is generated by LoadProgramNV if the problem
specified fails to conform to any of the semantic restrictions
imposed on programs of the type specified by target. The value of
PROGRAM_ERROR_POSITION_NV is still updated when this error is
generated.
INVALID_OPERATION is generated by BindProgramNV if target does not
match the type of the program named by id.
INVALID_VALUE is generated by AreProgramsResidentNV if any of the
queried programs are zero or do not exist.
INVALID_OPERATION is generated by GetProgramivNV or
GetProgramStringNV if the program named id does not exist.

FIG. 5 illustrates new states 500 that may be relevant in the context of the present embodiment.

Issues & Options

The present extension may interact with a ARB_multisample extension. In the ARB_multisample extension, each fragment has multiple depth values. In the present extension, a single interpolated depth value may be modified by a fragment program. As such, the depth values for the extra samples may be generated by computing partials of the computed depth value and using these partials to derive the depth values for each of the extra samples.

The present extension may also interact with polygon offset. Both extensions modify fragment depth values. As set forth in the base OpenGL® spec, the depth offset generated by polygon offset is added during polygon rasterization. The depth value provided to programs in f[WPOS] already includes polygon offset. If the depth value is replaced by a fragment program, the polygon offset value may not necessarily be recomputed and added back after program execution.

This is probably not desirable for fragment programs that modify depth values since the partials used to generate the offset may not match the partials of the computed depth value. Polygon offset for filled polygons can be approximated in a fragment program using the depth partials obtained by the DDX and DDY instructions. This may not work properly for line- and point-mode polygons, since the partials used for offset are computed over the polygon, while the partials resulting from the DDX and DDY instructions are computed along the line (or are zero for point-mode polygons). In addition, separate treatment of points, line segments, and polygons is not necessarily possible in a fragment program.

Depth component replacement may be an attribute of the fragment program or a separate enable. Preferably, it may be a program attribute. Using the output register notation simplifies matters: depth components are replaced if the DEPR register is written to. This alleviates the application and driver burden of maintaining separate state. q texture coordinates may be handled with this extension. However, fragment programs are allowed to access an associated q texture coordinate, so this attribute is produced by rasterization. In unextended OpenGL® 1.2, the q coordinate is eliminated in the rasterization portions of the spec after dividing each of s, t, and r by it. The present extension may update the specification to pass q coordinates through to conventional texture mapping before being eliminated there in an similar manner. This modification has the added benefit of simplifying the equations used for attribute interpolation.

Clip w coordinates may be handled by this extension. However, fragment programs are allowed to access the reciprocal of the clip w coordinate, so this attribute is produced by rasterization. The OpenGL® 1.2 spec doesn't explicitly enumerate the attributes associated with the fragment, but treatment of the w clip coordinate may be added in the appropriate locations.

The reciprocal of the clip w coordinate in traditional graphics hardware is produced by screen-space linear interpolation of the reciprocals of the clip w coordinates of the vertices. However, the present embodiment may obtain the clip w coordinate by perspective-correct interpolation of the (non-reciprocated) clip w vertex coordinates. These two formulations turn out to be equivalent, and the latter is more convenient since the core OpenGL® spec already contains formulas for perspective-correct interpolation of vertex attributes.

If the requested texture image is inconsistent, the TEX/TXP/TXD instructions produces a vector that is specified to be (0,0,0,0). This behavior is consistent with the other texture shader extensions (i.e. NV_texture_shader extension). It should be noted that these instructions ignore the standard hierarchy of texture enables.

A minimum precision may be specified for certain fragment attribute registers (i.e. COL0, COL1) that may not be generated with full fp32 precision. However, the precision of COL0/COL1 may generally be at least as high as that of the frame buffer.

The present embodiment may optionally guarantee that temporary registers are initialized to zero. This may allow for the modular construction of programs that accumulate results in registers. For example, per-fragment lighting may use MAD instructions to accumulate color contributions at each light. Without zero-initialization, the program would require an explicit MOV instruction to load 0 or the use of the MUL instruction for the first light.

While not recommended, the specification may make any accommodation for Unicode program strings.

While program type prefixes PS2.0 or FP1.0 may be utilized, FP1.0 may be preferred in some embodiments. There might be a compelling argument for sharing a prefix with other languages if the syntax and semantics were similar.

While fragment source registers may have equivalent integer names in the program language, it may not be recommended. In NV_vertex_program, vertex attributes could be specified directly by an application using an attribute number. Those numbers may have no necessary correlation with the conventional attribute names, although conventional attributes are mapped to attribute numbers. However, conventional attributes are the outputs of vertex programs and of rasterization. Therefore, there may be no need for a similar input-by-number functionality for fragment programs.

In one embodiment, multiple precisions may be supported for operands and operations. Low-precision operands are generally adequate for representing colors. Allowing low-precision registers also allows for a larger number of temporary registers (at low precision). Low-precision operations also provide the opportunity for a higher level of performance. In situations where low-precision operations are insufficient, applications are still free to use higher precision operations.

The precision with which operations are carried out may be specified in any desired manner. One may infer the precision from the types of the operands, result vectors, and/or an attribute of an instruction. In one embodiment, precision can be specified using an instruction suffix for maximum control and to permit the use of 12-bit fixed point operations. The precision suffix is optional. If a precision suffix is not specified, instructions may be carried out using the precision of the destination register.

Always inferring the precision from the operands has a number of issues. First, there are a number of operations (e.g., TEX/TXP/TXD) where result type has little to no correspondence to the type of the operands. In these cases, precision suffixes may not necessarily be supported. Second, one may have instructions automatically cast operands and compute results using the type of the highest precision operand or result. This behavior may be problematic since all fragment attribute registers and program parameters are kept at full precision, but full precision may not be needed by the operation.

Giving the program explicit control over the precision allows it to dictate precision explicitly should eliminate any uncertainty over type casting.

For instructions whose specified precision is different than the precision of the operands or the result registers, the operations may be performed and the condition codes may be updated in any desired manner. For example, operations may be performed with operands and results at the precision specified by the instruction. After the operation is complete, the result may be converted to the precision of the destination register, after which the condition code is generated.

In an alternate approach, the condition code could be generated from the result. However, in some cases, the register contents may not match the condition code. In such cases, it may not be reliable to use the condition code to prevent "illegal" operations or to handle special cases.

One may or may not provide the ability to issue instructions that do not update temporary or output registers. Instructions can update the condition code register as a side effect. Requiring instructions to write their results to a register could result in a register spill (overflowing the number of allowable registers) that could be otherwise avoided. Also, it may be possible to optimize fragment programs with instructions that both write to a temporary registers and update condition codes, if the results written to the temporary are never used.

This may be accomplished by adding two "write-only" temporary pseudo-registers (RC and HC) that can be specified as destination registers.

PK2/PK4/UP2/UP4 instructions may be useful for packing multiple attribute sets into a "wide" frame buffer. For example, a 128-bit "RGBA" frame buffer could pack 16 8-bit quantities or 8 16-bit quantities, all of which could be used in later rasterization passes.

As an option, a method may be provided for specifying an fp 16 depth component value.

RequestResidentProgramsNV (or an equivalent function) may take a target. Dealing with working sets of different program types may be difficult. One may wish to document some limitation if programs of different types are received. A target may be attached to this command. The driver is responsible for ensuring consistent results when the program types specified are mixed.

On data type conversions where the original value is not representable in the new data type, either due to overflow or insufficient precision in the destination type, various things may happen. In case of overflow, the original value may be clamped to the largest (or smallest) representable value in the new type. In case of imprecision, the conversion may either be rounded or truncated to the nearest representable value.

IEEE-style denorms may optionally be supported. For 32-bit IEEE floating point, denorms are numbers smaller in absolute value than $2^{-126}$. For 16-bit floats used by this extension, denorms are numbers smaller in absolute value than $2^{-14}$. For 32-bit data types, hardware support for denorms may be considered too expensive relative to the benefit provided. Computational results that would otherwise produce denorms are flushed to zero. For 16-bit data types, hardware denorm support may be considered. The expense of hardware denorm support is lower and the potential precision benefit is greater for 16-bit data types.

If one tries to do a lookup on the same texture multiple times with different coordinates, various things may happen. Embodiments could choose a variety of behaviors when executing a fragment program that do a lookup into the same texture multiple times with different coordinates. There are compelling reasons to support multiple independent lookups (e.g., shared light maps or other similar effects), and this should be supported.

Standard OpenGL® provides a hierarchy of texture enables. The texture lookup operations in various texture shaders (i.e. NV_texture_shader) effectively override the texture enable hierarchy and select a specific texture to enable. Various things may be done by the present extension. For example, the present extension may build upon such texture shaders and reduce the driver overhead of validating the texture enables. Texture lookups can be specified by instructions like "TEX H0, f[TEX2], TEX2, 3D", which would indicate to use texture coordinate set number 2 to do a lookup in the texture object bound to the TEXTURE_3D target in texture image unit 2.

Since programs can use texture maps arbitrarily, there may be a semantic restriction that fragment programs can not reference different texture targets in the same texture image unit.

The present extension may have various interactions with register combiners (i.e. NV_register_combiners). For example, such register combiners may be available, even in fragment program mode, because it is commonly used and provides a powerful blending model. For example, it may allow four operands, fast 1-x operations, separate operations on color and alpha components, and more.

These operations could be performed by fragment programs, but would require multiple instructions and program parameter constants. Supporting both features simultaneously allows a programmer to write a program to obtain texture colors and then use the combiners to obtain a final fragment color.

As such, there are two different types of fragment programs: one "normal" and one for combiners. For combiner programs, the texture colors TEXTURE0 through TEXTURE3 may be taken from output registers TEX0 through TEX3, respectively. The other combiner registers are not modified in fragment program mode.

For convenience, pseudo-instructions not present in the hardware instruction set that are trivially implementable may be included. For example, absolute value and subtract instructions could fall in this category. An "ABS R1,R0" instruction would be equivalent to "MAX R1,R0, −R0", and a "SUB R2,R0,R1" would be equivalent to "ADD R2,R0,−R1." A SUB instruction may be provided for convenience. Adding an ABS instruction may not be necessary because absolute value operations of each operand may be supported.

The comparison operations work with special-case floating-point encodings of zero, namely +0.0/−0.0. Both encodings may be produced by the math units, and should be treated consistently. For the purposes of comparisons, +0.0 and −0.0 may be identical. However, 1.0/+0.0=+INF, while 1.0/−0.0=−INF.

As an option, there may be a '+' in the <optionalSign> portion of the grammar for orthogonality/readability. A '+' obviously adds no functionality. An <optionalSign> of "−" may be used as a sign for a constant value, or for any other purpose.

The same fragment attribute register, program parameter register, or constants can optionally be used for multiple operands in the same instruction, even with different swizzle patterns. Run-time conditional write masks and independent data types for each physical register slot makes the specification of the use of physical registers quite complex. This full generality may or may not be worthwhile.

The present extension allows different limits for the number of texture coordinate sets and the number of texture image units (i.e., texture maps and associated data). The state in ActiveTextureARB affects both coordinate sets (TexGen, matrix operations) and image units (TexParameter, TexEnv). This may be dealt with in various ways.

For example, one may wish to continue to use ActiveTextureARB and emit an INVALID_OPERATION if the active texture refers to an unsupported coordinate set/image unit. Other options include creating a dummy (unusable) state for unsupported coordinate sets/image units and continue to use ActiveTextureARB normally, or creating separate state and state-setting commands for coordinate sets and image units.

Separate state may be the cleanest solution, but would add more calls and potentially cause more programmer confusion. Dummy state would avoid additional error checks, but the demands of dummy state could grow if the number of texture image units and texture coordinate sets increases.

The OpenGL® spec is vague as to what state is affected by the active texture selector and has no destination between coordinate-related and image-related state. The state tables could use a good clean-up in this area.

The LRP instruction is defined so that the result of "LRP R0, R0, R1, R2" is R0*R1+(1−R0)*R2. There are conflicting precedents here. The definition here matches the "lrp" instruction in the DirectX 8.0 pixel shader language. However, an equivalent RenderMan lerp operation would yield a result of (1−R0)*R1+R0*R2. This ordering would make more sense for interpolation if R0 contains the fractional portion of a coordinate used for sampling between R1 and R2. It should be noted that any ordering may be implemented. For example, hardware may implement the DirectX 8.0-style operand ordering. There may be no good reason to create an internal conflict. To achieve the equivalent functionality for RenderMan, the third and fourth arguments may be swapped.

The present extension may or may not provide tracking of matrices or any other conventional or extended OpenGL® state. Further, the present extension may or may not provide global program parameters—values shared between multiple fragment programs.

In one embodiment, the present extension may provide local program parameters. Local parameters can be managed by the driver and eliminate the need for applications to manage a global name space. Local parameters work much like standard variable names in most programming languages. They are created using the "DECLARE" instruction within the fragment program itself (e.g., "DECLARE color={1,0,0,1} "). Local parameters are used simply by referencing the variable name. They do not require the array syntax like the global parameters in the NV_vertex_program extension.

Various initial values may be used as an uninitialized local parameter (i.e. (0,0,0,0)). This choice is somewhat arbitrary.

The present extension may or may not provide support constants in fragment programs. Scalar or vector constants can be defined inline (e.g., "1.0" or "{1,2,3,4} "). In addition, named constants may be supported using the "DEFINE" instruction, which allow programmers to change the values of constants used in multiple instructions simply be changing the value of the named constant.

It should be noted that because this extension may use program strings, the floating-point value of any constants generated on the fly may be printed to the program string. An alternate method that avoids the need to print constants is to declare a local program parameter and initialize it with the ProgramLocalParameter4[f,fv]( ) calls.

Named constants, in one embodiment, may not be allowed to be redefined.

Further, functions used to update or query local parameters may take a zero-terminated string (as with most strings in the C programming language), or require an explicit string length. If the former, a version of program such as LoadProgramNV may be created that does not require a string length.

In one embodiment, an explicit string length may be preferred. Strings that are defined as constants can have the length computed at compile-time. Strings read from files may have the length known in advance. Programs to build strings at run-time also likely keep the length up-to-date. Passing an explicit length saves time, since the driver doesn't have to compute the string length.

In unextended OpenGL® 1.2, the alpha component of the secondary color is forced to 0.0. As an option, the alpha of the secondary color may be well-defined and can be used normally.

Fragment program instructions involving f[FOGC] or f[TEX0] through f[TEX7] may be automatically carried out at full precision. If such instructions absolutely must be carried out at lower precision, the requirement can be met by first loading interpolants into a temporary register.

The output register nomenclature may or may not be necessary on architextures without dedicated output registers. Further, the temporary registers may simply be used directly. The clamping behavior on fragment program outputs feeding register combiners may vary. The results may be clamped to [0,1], [−1,1], or something else. It should be noted that the "X" instructions clamp to [−2,2].

With a different number of texture coordinate sets and texture image units, various number copies of each kind of texture state may exist. The intention is that texture state be broken into three groups: (1) texture coordinate set state, of which there are MAX_TEXTURE_COORDS_NV copies, (2) texture image unit state, of which there are MAX_TEXTURE_IMAGE_UNITS_NV copies, and (3) legacy OpenGL® texture unit state (e.g., enable, TexEnv blending state) that is unused by fragment programs, of which there are MAX_TEXTURE_UNITS_ARB.

The GLX protocol for various programs such as LoadProgramNV (and ProgramLocalParameterNV) may end up with programs >64 KB. This may overflow the limits of the GLX Render protocol, resulting in the need to use RenderLarge path.

Textures used by fragment programs may or may not be declared. For example, "TEXTURE TEX3, 2D", indicating that the 2D texture should be used for all accesses to texture unit 3. The dimension may be dropped from the TEX family of instructions, and some of the compile-time error checking could be dropped.

Having negative q values can happen frequently with projective texture mapping. As such, they may optionally be defined in the present specification. This restriction carries on a similar one in the initial OpenGL® specification. One obvious issue is that primitives with q coordinates of different signs. When interpolating, it is possible for a fragment to have an interpolated q coordinate at or near 0.0. This may result in a divide-by-zero error or significant numerical instability.

This could also conceivably be an issue with w coordinates, except that primitives may be clipped to areas where w>0.

Programs that replace depth may have their own special program type such as "!!FPD1.0" and "!!FPDC1.0".

As an option, the fx12 value to which NaN maps may be 0.0.

While various embodiments have been described above, it may be understood that they have been presented by way of example only, and not limitation. Thus, the breadth and scope of a preferred embodiment may not be limited by any of the above described exemplary embodiments, but may be defined only in accordance with the following claims and their equivalents.

What is claimed is:

1. A method for programmable processing of fragment data in a computer hardware graphics pipeline, comprising:
    (a) receiving fragment data selected from the group consisting of constant registers, color values and texture coordinates associated with a fragment;
    (b) performing programmable operations on the fragment data in order to generate output; and
    (c) storing fragment data associated with the generated output in a frame buffer;
wherein the operations are programmable by a user utilizing instructions from a predetermined instruction set in a sequence specified in an application program interface in which a fragment program is a sequence of 4-component vector operations that determine how a set of program registers and input set of per-fragment parameters are transformed to a set of per-fragment result parameters.

2. A computer readable medium encoded with a computer program to implement the steps of:
    (a) receiving fragment data selected from the group consisting of constant registers, color values and texture coordinates associated with a fragment; and
    (b) performing programmable operations on the fragment data in order to generate output; and (c) storing fragment data associated with the generated output in a frame buffer;

wherein the operations are programmable by a user utilizing instructions from a predetermined instruction set in a sequence specified in an application program interface in which a fragment program is a sequence of 4-component vector operations that determine how a set of program registers and input set of per-fragment parameters are transformed to a set of per-fragment result parameters.

3. A computer readable medium encoded with a computer program to implement the steps of:
 (a) performing programmable operations on fragment data in order to generate output;
 (b) wherein the operations are programmable by a user utilizing instructions from the instruction set in a sequence specified in an application program interface in which a fragment program is a sequence of 4-component vector operations that determine how a set of program registers and input set of per-fragment parameters are transformed to a set of per-fragment result parameters.

4. A method for processing of fragment data in a computer hardware graphics pipeline, comprising:
 (a) receiving fragment data selected from the group consisting of constant registers, color values and texture coordinates associated with a fragment;
 (b) retrieving texture data utilizing the texture coordinates in accordance with a fragment program;
 (c) performing programmable mathematical computations involving the fragment data in accordance with the fragment program; and
 (d) outputting at least one of color values and depth values based on the texture data and the mathematical computations; and
 (e) storing fragment data associated with the generated output in a frame buffer;

wherein the programmable mathematical computations are performed in a computer hardware graphics pipeline in a sequence specified in a graphics application program interface in which the fragment program is a sequence of 4-component vector operations that determine how a set of program registers and input set of per-fragment parameters are transformed to a set of per-fragment result parameters.

5. The method as recited in claim 4, and further comprising executing individual fragment program instructions of the fragment program.

6. A method for processing of fragment data in a computer hardware graphics pipeline, comprising:
 (a) receiving fragment data;
 (b) performing programmable partial derivative operations involving the fragment data in accordance with a fragment program; and
 (c) outputting at least one of color values and depth values resulting at least in part from the partial derivative operations; and
 (d) storing fragment data associated with the generated output in a frame buffer;

wherein the programmable partial derivative operations are performed in a computer hardware graphics pipeline in a sequence specified in a graphics application program interface in which the fragment program is a sequence of 4-component vector operations that determine how a set of program registers and input set of per-fragment parameters are transformed to a set of per-fragment result parameters.

7. A method for processing of fragment data in a computer hardware graphics pipeline, comprising:
 (a) receiving fragment data including texture coordinates associated with a fragment;
 (b) retrieving texture data utilizing the texture coordinates in accordance with a fragment program based on programmable texture operations; and
 (c) outputting at least one of color values and depth values based at least in part on the texture data; and
 (d) storing fragment data associated with the generated output in a frame buffer; wherein the programmable texture operations are performed in a computer hardware graphics pipeline in a sequence specified in a graphics application program interface in which the fragment program is a sequence of 4-component vector operations that determine how a set of program registers and input set of per-fragment parameters are transformed to a set of per-fragment result parameters.

8. A method for processing of fragment data in a computer hardware graphics pipeline, comprising:
 (a) receiving fragment data;
 (b) programmably processing the fragment data; and
 (c) outputting at least one of color values and depth values resulting at least in part from the programmable processing; and
 (d) storing fragment data associated with the generated output in a frame buffer;

wherein the fragment data includes at least one of multiple component vectors and floating point vectors, and the programmable processing is performed in a computer hardware graphics pipeline in a sequence specified in a graphics application program interface in which a fragment program is a sequence of 4-component vector operations that determine how a set of program registers and input set of per-fragment parameters are transformed to a set of per-fragment result parameters.

9. A computer readable medium encoded with a computer program to implement the steps of:
 (a) for receiving a fragment program; and
 (b) translating the fragment program;

wherein the fragment program is translated for being handled by a computer hardware graphics pipeline that is partially programmable, and programmable processing of fragment data is performed in the computer hardware graphics pipeline in a sequence specified in a graphics application program interface in which the fragment program is a sequence of 4-component vector operations that determine how a set of program registers and input set of per-fragment parameters are transformed to a set of per-fragment result parameters.

* * * * *